(12) United States Patent
Fyke et al.

(10) Patent No.: US 8,674,527 B2
(45) Date of Patent: Mar. 18, 2014

(54) APPARATUSES AND METHODS FOR ENERGY STORAGE

(75) Inventors: Aaron D. Fyke, Altadena, CA (US);
James T. Baker, Temple City, CA (US);
Braden E. Hines, Pasadena, CA (US);
William T. Gross, Pasadena, CA (US);
Christian T. Gregory, La Crescenta, CA (US)

(73) Assignee: Energy Cache, Inc., Pasadena, CA (US)

( * ) Notice: Subject to any disclaimer, the term of this patent is extended or adjusted under 35 U.S.C. 154(b) by 54 days.

(21) Appl. No.: 13/111,717

(22) Filed: May 19, 2011

(65) Prior Publication Data
US 2011/0285147 A1    Nov. 24, 2011

Related U.S. Application Data

(60) Provisional application No. 61/395,994, filed on May 20, 2010, provisional application No. 61/458,754, filed on Dec. 1, 2010.

(51) Int. Cl.
*F02B 63/04* (2006.01)
*F03G 7/08* (2006.01)

(52) U.S. Cl.
USPC .............................................. 290/1 R; 290/7

(58) Field of Classification Search
USPC ........................................ 290/1 R; 60/675
See application file for complete search history.

(56) References Cited

U.S. PATENT DOCUMENTS

| 3,405,278 A | 10/1968 | Ley |
| 4,284,899 A | 8/1981 | Bendiks |
| 4,918,282 A * | 4/1990 | Cheek ...................... 219/121.37 |
| 5,340,218 A * | 8/1994 | Cuthbertson ................... 383/67 |

(Continued)

FOREIGN PATENT DOCUMENTS

| JP | 06-193553 | 7/1994 |
| KR | 10-0570880 B1 | 4/2006 |
| KR | 10-2009-0110891 A | 10/2009 |

OTHER PUBLICATIONS

Wood, Bruce; "Hanging Tomato Plants"; Mar. 4, 2009; retrieved May 9, 2013 using Internet Archive to view rubberingot.com.*

(Continued)

*Primary Examiner* — Tulsidas C Patel
*Assistant Examiner* — Thomas Quigley
(74) *Attorney, Agent, or Firm* — Knobbe Martens Olson & Bear LLP

(57) ABSTRACT

Some embodiments relate to an energy storage and generation system, comprising a cable system having a first end portion located at a first elevation and a second end portion located at a second elevation, a plurality of mass carriers supported by the cable system, one or more motor generators coupled with the cable system and with an energy grid, a control system in communication with at least the one or more motor generators, a first mass pile area configured to store mass medium positioned at the first elevation, and a second mass pile area configured to store mass medium positioned at the second elevation that can be higher than the first elevation. The one or more motor generators can move the cable system in an energy storing state and be moved by the cable in an energy generating state. The system can store energy by transferring mass medium from the first mass pile area to the second mass pile area, and can generate energy by transferring mass medium from the second mass pile area to the first mass pile area.

21 Claims, 29 Drawing Sheets

(56) References Cited

U.S. PATENT DOCUMENTS

| | | | |
|---|---|---|---|
| 6,866,815 B2* | 3/2005 | Gohres et al. | 266/246 |
| 7,191,710 B2 | 3/2007 | Powell | |
| 7,712,326 B2 | 5/2010 | Jagusztyn et al. | |
| 7,743,609 B1 | 6/2010 | Brostmeyer | |
| 7,886,537 B2 | 2/2011 | Jagusztyn et al. | |
| 2007/0000246 A1 | 1/2007 | Prastitis | |
| 2009/0193808 A1 | 8/2009 | Fiske | |
| 2009/0231123 A1* | 9/2009 | Rowell et al. | 340/532 |
| 2010/0283263 A1 | 11/2010 | Schilling | |
| 2010/0301616 A1* | 12/2010 | Al-Khamis | 290/1 R |
| 2011/0027107 A1 | 2/2011 | Bekken | |
| 2011/0050158 A1 | 3/2011 | MacDonald et al. | |

OTHER PUBLICATIONS

"A Weighting game," International Water Power & Dam Construction, Apr. 13, 2010, 8 pages.

Search Report/Written Opinion mailed Feb. 19, 2012, International Application No. PCT/US2011/037252, 9 pages.

* cited by examiner

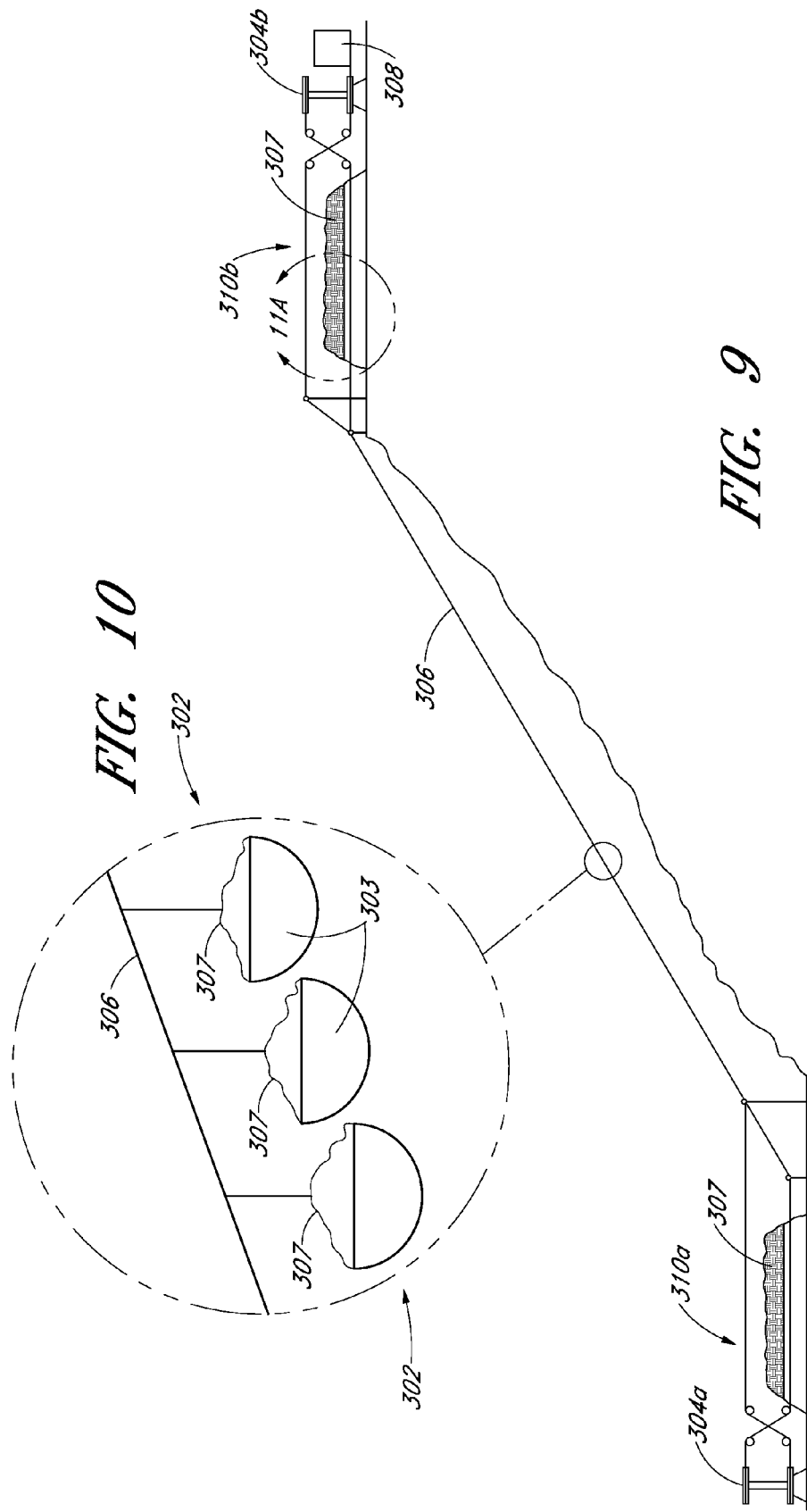

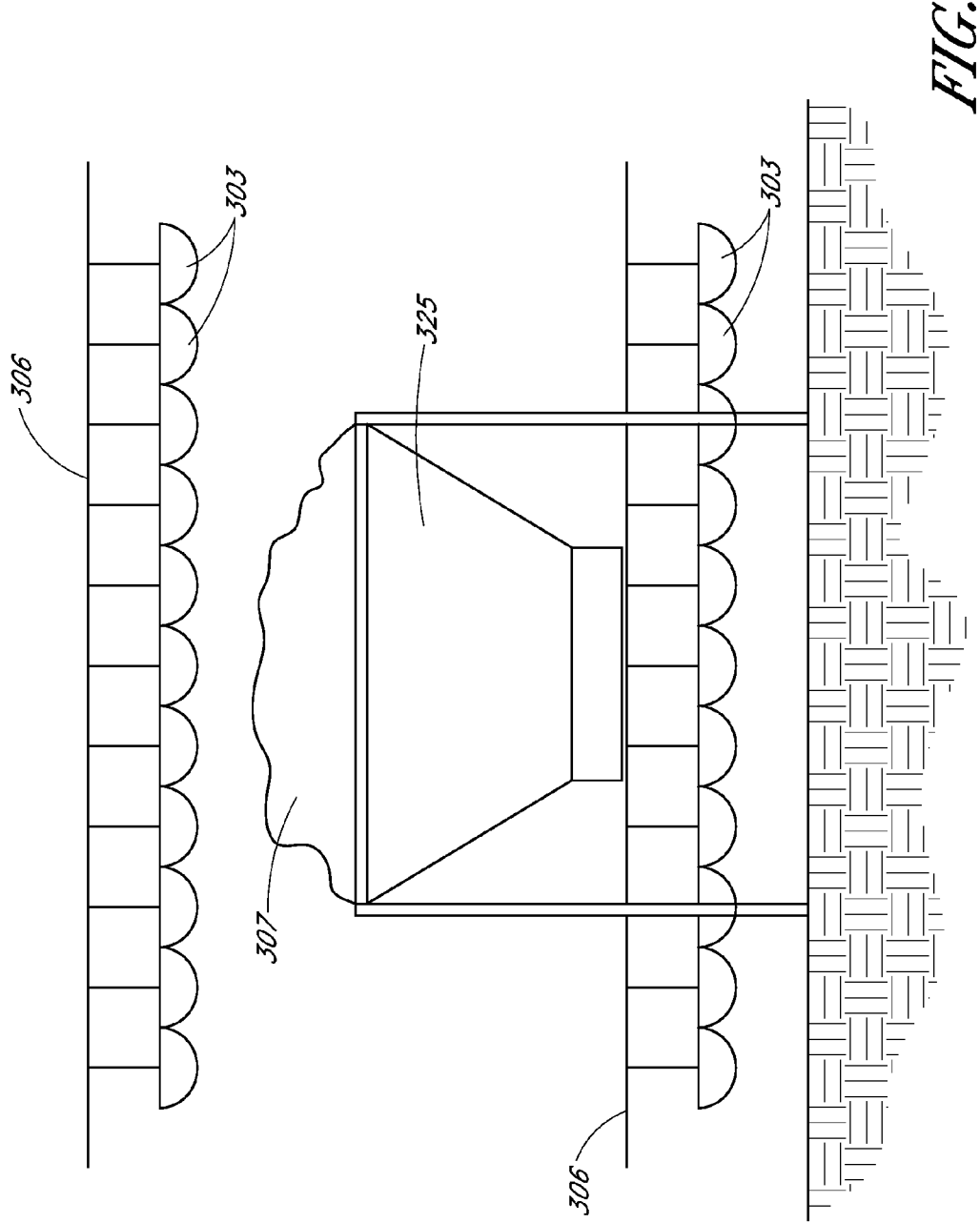

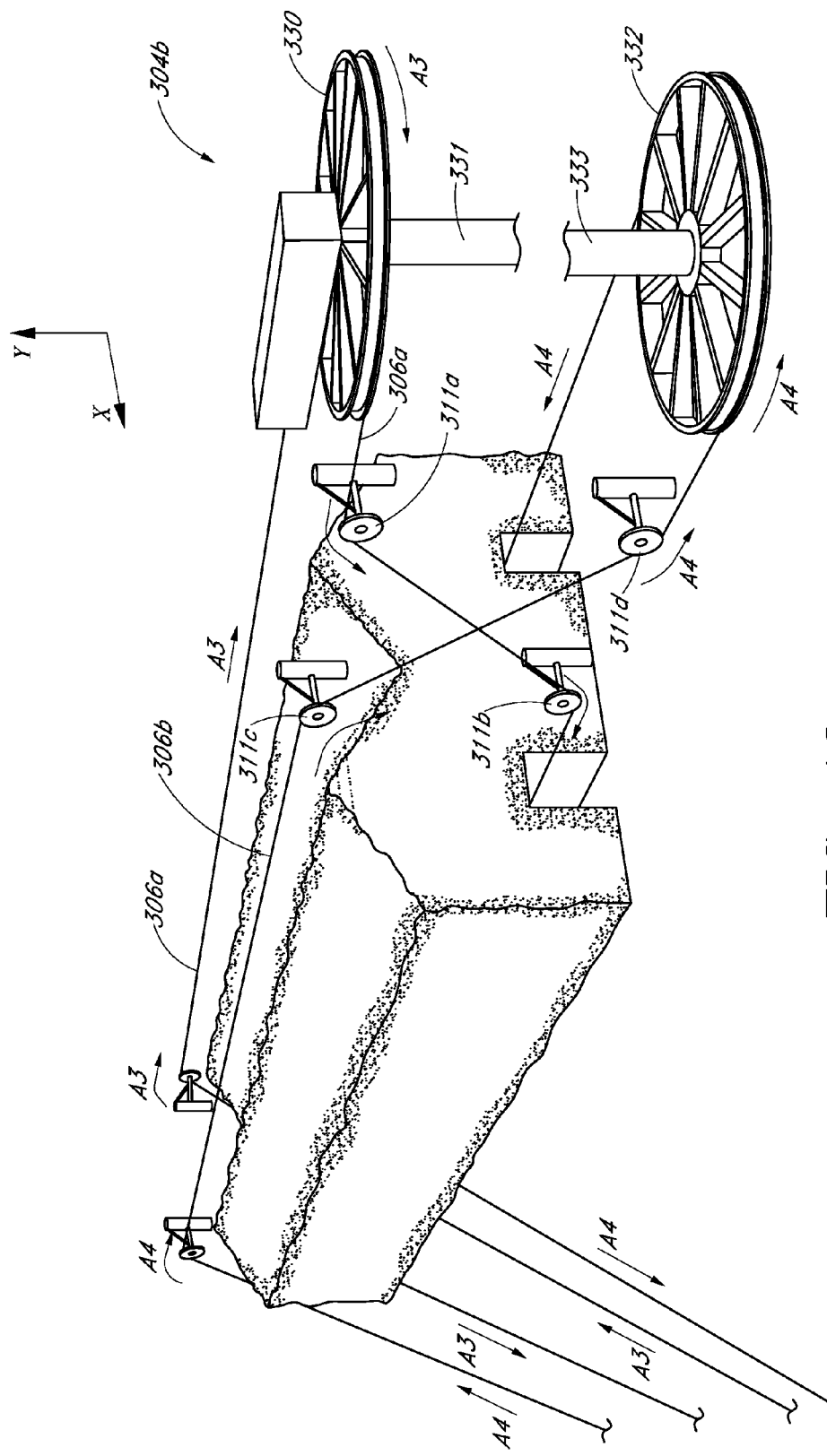

US 8,674,527 B2

APPARATUSES AND METHODS FOR ENERGY STORAGE

PRIORITY INFORMATION AND INCORPORATION BY REFERENCE

This application claims priority benefit of U.S. Provisional Application 61/395,994 (titled "ENERGY STORAGE SYSTEM"), filed May 20, 2010, and U.S. Provisional Application 61/458,754 (titled "ENERGY STORAGE SYSTEM AND METHOD"), filed Dec. 1, 2010, which applications are hereby incorporated by reference in their entireties as if fully set forth herein. The benefit of priority is claimed under the appropriate legal basis including, without limitation, under 35 U.S.C. §119(e).

BACKGROUND OF THE DISCLOSURE

1. Field of the Disclosure

The present disclosure relates to energy storage devices, in particular, energy storage devices configured to provide fast response ancillary services and/or bulk energy storage which may be used with large scale electricity grids.

2. Background of the Disclosure and Description of the Related Art

The electricity power grid has little means of storing energy. Therefore, the amount of electricity generated should instantaneously match demand as closely as possible. Despite efforts to supply the power grid with the electricity that precisely matches the instantaneous demand, the actual power provided to the grid often exceeds or falls short of the actual power demand at any given moment, causing deviations in the frequency, away from the target operating condition, of the alternating current of the electricity grid. There is therefore a need for a system for rapidly absorbing energy from and outputting energy to the grid.

Likewise, due to dramatic changes in the demand for electricity over a typical 24 hour period, it is necessary for a grid operator to dispatch and curtail electricity generation assets to match the changes in demand. The time difference between minimum and maximum demand can be as long 12 hours. Therefore, a bulk energy storage device, being defined as a device which can produce megawatts of power, sufficient for participating in the electricity grid, and can operate for several hours in duration when either consuming or producing electricity, is needed to manage these large swings in electricity demand.

SUMMARY OF SOME EXAMPLE EMBODIMENTS

Some embodiments of the present disclosure relate to novel energy storage systems and methods which can be used to address several energy storage markets and needs, spanning from fast response ancillary services to bulk energy storage. The energy storage devices of the present disclosure can provide support for the stable operation of the electrical grid by storing and then releasing large amounts of energy.

In some embodiments, the energy storage devices can comprise a plurality of cables or loops of cables that can be positioned adjacent to one another to form an array of cable loops. In some embodiments, the cable loops can be stretched between two bullwheels, from which hooks or carriers can be supported. The hooks or carriers can be used to transport weights from a higher to lower elevation to generate electricity, or from lower to higher elevation to store electrical energy. The overall capacity of the storage installation can be changed by either increasing the weights of any one cable loops, or by increasing the number of cable loop systems in an installation.

In some embodiments, electricity can transferred to and from the electrical grid through a set of power electronics connected to an electric motor/generator. The electric motor can be connected to the bullwheel, located at one end of the cable. The rotation of the bullwheel can cause the cable to translate, pulling the hooks or carriers in one direction or the other (e.g., either uphill or downhill) depending on whether energy is stored or generated. The movement of the carriers, with attached weights or masses, can cause the weights/masses to be raised or lowered, which can either store or generate electricity due to the gravitational forces on the masses. The velocity of the moving weights or masses can allow energy to be stored as kinetic energy as well.

The energy can be stored both through the gravitational potential of raising weights as well as the kinetic energy of the velocity of the weights. In some embodiments, the weights can have of a low-cost shell, such as molded cement, metal, injected plastic, or other material, filled with low-cost gravel, rocks, or soil. In some embodiments, where the mass is configured to be rolled (for example, within a storage container) during handling, the shell can help maintain the rounded shape, such as the shape of a cylinder or sphere. When energy is needed to be generated, a weight will be picked up from the storage container at higher elevation and can be loaded onto the cable system. As weights reach the bottom of the cable system, they can be removed and stored within the lower storage container. Likewise, the process can work in reverse to store energy—weights can be removed from the lower storage container and be deposited in the higher storage container.

Some embodiments disclosed herein relate to an energy storage and generation system, comprising a cable system having a first end portion located at a first elevation and a second end portion located at a second elevation, a plurality of mass carriers supported by the cable system, one or more motor generators coupled with the cable system and with an energy grid, a control system in communication with at least the one or more motor generators, a first mass pile area configured to store mass medium positioned at the first elevation, and a second mass pile area configured to store mass medium positioned at the second elevation that can be higher than the first elevation. In some embodiments, the one or more motor generators can be configured to move the cable system in an energy storing state and be configured to be moved by the cable in an energy generating state so as to produce energy to the energy grid. The system can be configured to cause energy to be stored by transferring mass medium from the first mass pile area to the second mass pile area. The system can be configured to cause energy to be generated by the one or more motor generators of the energy storage system by transferring mass medium from the second mass pile area to the first mass pile area. In some embodiments, the system can further comprise program code stored in memory that, if executed by a computing system, causes the computing system to perform operations comprising receiving an offer to purchase energy from a first entity, receiving information regarding energy pricing from at least one source, and, based at least in part on the offer from the first entity and the energy pricing information, determining whether to generate energy.

Some embodiments or arrangements disclosed herein relate to a method of storing energy and/or supplying energy to a power grid using an energy storage device, comprising moving a plurality of carriers from a first elevation to a second elevation and/or from a second elevation to a first elevation, wherein the second elevation is higher than the first elevation, and transferring mass medium from the first elevation to the second and/or from the second elevation to the first elevation using the plurality of carriers. Transferring more mass from the first elevation to the second elevation than from the second elevation to the first elevation can cause the energy storage device to store energy received from the power grid. Transferring more mass from the second elevation to the first elevation than from the first elevation to the second elevation can cause the energy storage device to generate energy, wherein at least a portion of the generated energy is supplied to the power grid.

Some embodiments or arrangements disclosed herein relate to a method of controlling an energy storage device, comprising receiving over a network a communication regarding a request for or a price to be paid for frequency regulation with respect to a power grid, based at least in part on a payment offered with respect to supplying at least a portion of the requested frequency regulation, determining whether to provide at least the portion of the frequency regulation, if a determination is made to provide at least the portion of the frequency regulation, causing material to be raised from a first level to a second level to thereby consume power from the power grid, wherein the material is primarily a non-liquid, then causing the primarily non-liquid material to be lowered from the second level to the first level to thereby provide power to the power grid. In some embodiments, the raising and lowering of the primarily non-liquid material enhances the frequency regulation of the power grid.

Some embodiments or arrangements disclosed herein relate to a method of controlling an energy storage device. The method comprising the steps of storing energy during a first period of time, performing frequency regulation during a second period of time, and producing electricity for the power grid during a third period of time, all three stages occurring in sequence over the course a day. The process of storing energy during the first period of time preferably comprises the steps of: receiving electricity from the power grid; raising a solid ballast from a lower elevation to higher elevation (preferably greater than 100 meters) using the received electricity; receiving over a network a command to either produce electricity for the power grid or consume electricity from the power grid; varying the amount of received electricity in accordance with the command; and varying the rate at which solid ballast is raised from a lower elevation to higher elevation using the received electricity. The process of performing frequency regulation during a second period of time preferably comprises the steps of: receiving over a network a command to either produce electricity for the power grid or consume electricity from the power grid; and varying the amount of electricity received from or provided to the grid by alternating, respectively, between raising and lowering the solid ballast between the lower elevation and higher elevation in accordance with the command. The process of producing electricity for the power grid during a third period of time preferably comprises the steps: providing electricity to the power grid; lowering the solid ballast from the higher elevation to the lower elevation to generate the provided electricity; receiving over a network a command to either produce electricity for the power grid or consume electricity from the power grid; varying the rate at which solid ballast is lowed from the higher elevation to the lower elevation; and varying the amount of provided electricity in accordance with the command.

During the first period of time, the energy storage device is configured to only transport the ballast uphill by continuously loading solid ballast at the lower elevation and unload the ballast at the higher elevation. During the third period of time the energy storage device may transport ballast uphill or downhill. During the third period, the energy storage device is configured to only transport ballast downhill by continuously loading solid ballast at the lower elevation and unload the ballast at the higher elevation. During the second period of time, the energy storage device is configured to quickly alternate between storing energy and producing energy, or producing energy and storing energy, in the scale of 1 and 10 seconds.

The energy storage device may comprise a plurality of cables, each cable configured to transport solid ballast between the higher and the lower elevation. The energy storage device may vary the quantity or speed of the ballast transported between the lower and the higher elevation based on the amount of electricity to be retrieved from or provided to the power grid. In addition, the different cables may be operated at different speeds from one another and/or transport different amounts of ballast from one another in order to optimize performance.

BRIEF DESCRIPTION OF THE DRAWINGS

The drawings are provided to illustrate example embodiments described herein and are not intended to limit the scope of the disclosure.

FIG. 9 is a side view of another example embodiment of an energy storage device.

FIG. 10 is an enlarged view of a portion of the example embodiment of the energy storage device illustrated in FIG. 9.

FIG. 11B is an enlarged view of a portion of another example embodiment to the loading portion of the embodiment of the energy storage device illustrated in FIG. 9.

FIG. 13 is a perspective view of the example embodiment of the energy storage device illustrated in FIGS. 12A and 12B, taken from an upper view.

DETAILED DESCRIPTION OF SOME EXAMPLE EMBODIMENTS

Figure 1A:
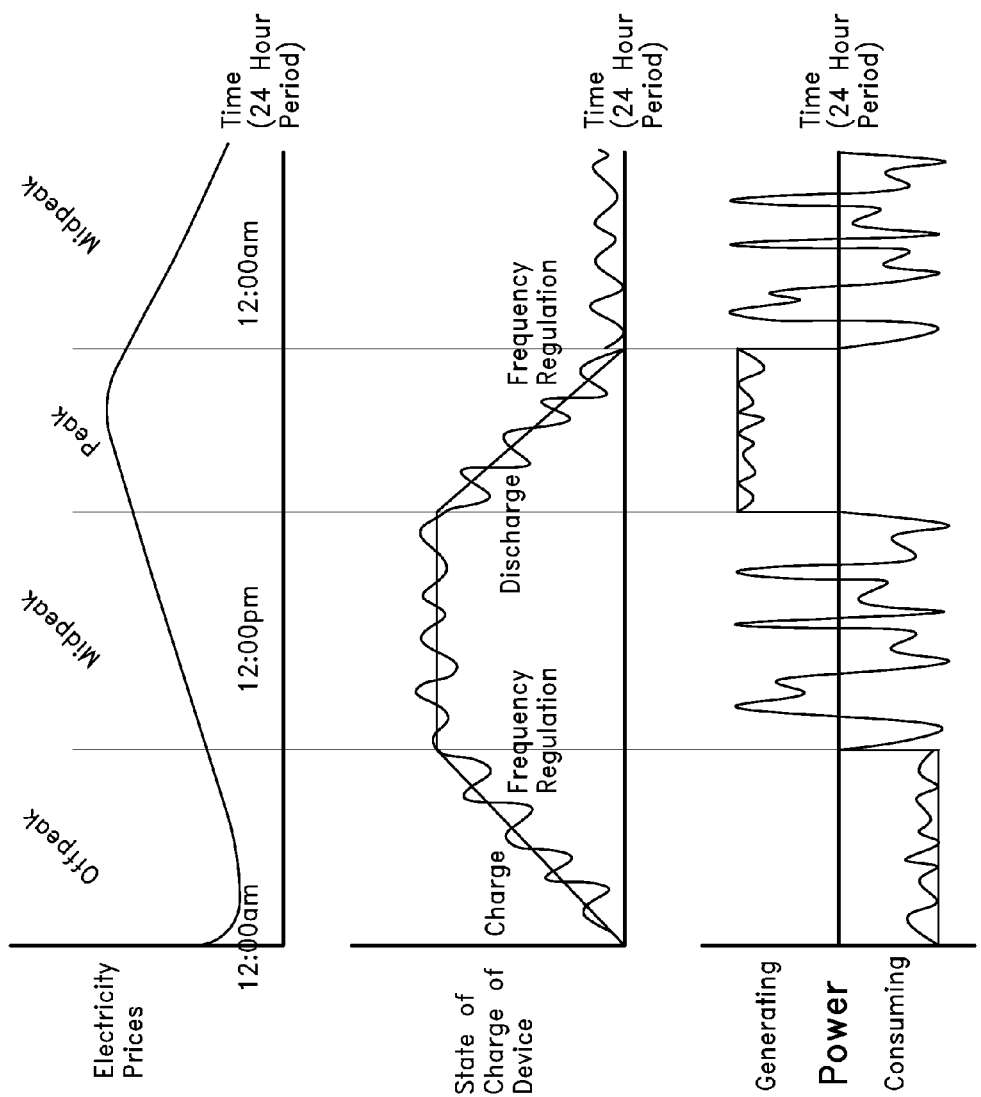
FIG. 1A is a graphical representation of electricity prices, state of charge of some embodiments of energy storage devices disclosed herein, and power generation and consumption of some embodiments of energy storage devices disclosed herein over a 24 hour period.

The electricity grid has little means of storing energy. Without such storage solutions, conventionally the amount of electricity generated must instantaneously match demand. Conventionally, this has been a difficult goal to achieve. Further, conventional techniques for the mass storage of energy, such as hydro-based techniques involving the movement of water from one level to another, have often been impractically expensive, require geographical conditions that are rare or expensive to create (e.g., large upper and lower reservoirs for holding the water), and may involve a significant level of risk (e.g., in the case of hydro-based techniques, flooding risks in the event of a reservoir dam failure, heavy rainfalls, earthquakes, etc.).

By contrast, certain embodiments disclosed herein provide services that can efficiently address the need for bulk energy storage via certain grid-scale energy storage device embodiments and/or can provide substantially instantaneous power or consummation of power in order to aid in power regulation of the power grid. Further, certain embodiments access data with regards to requests for bulk power or power regulation (e.g., via pricing data or signals or otherwise), determine (based on one or more criteria) the advisability of providing such bulk power and/or power regulation, and then provide (or not provide) such bulk power or power regulation in accordance with such determination.

"Bulk Energy" corresponds to the unit of energy which is at least one megawatt of power, with a duration of at least one hour (either being consumed or produced). "Bulk Power" is defined as at least one megawatt of power. This distinction is important to differentiate certain example embodiments from non-bulk energy storage devices (although other embodiments may be in the form of non-bulk energy storage devices). These would include devices which can consume or produce megawatts of power, but can only operate continuously for a few minutes without recharging (such as typical flywheels, super-capacitors, some battery systems), or devices which can last several hours, but cannot produce megawatts of power (e.g., other battery systems), or embodiments disclosed herein that have relatively little mass available to transport.

Typically, there are three major ancillary services that can be provided to the grid, in addition to just selling bulk energy or electricity. The three are often referred to as non-spinning reserve, spinning reserve, and frequency regulation. All or a subset of the three such services can be provided by the energy storage device embodiments disclosed herein. Frequency regulation can, in many instances, be the most lucrative. The term "non-spinning reserve" refers to a power generator that is completely shut off (the shaft is not spinning). However, if needed, the power generator can be activated and conventionally can start providing power in approximately 30 minutes. Because the generator is merely sitting idle, this service is paid the least. The next is term, "spinning reserve" refers to a generator that is on, and spinning, but is producing no electricity. The generator is merely idling, consuming minimum fuel, but can produce power very quickly. Conventionally, such idling generators can sometimes be activated to provide power in 10 minutes. Because of the quicker response time, this service is typically paid more. "Frequency regulation" requires a generator to respond to a signal within seconds, and is the highest paid service of the three. All three of these services can be provided with at least some of the embodiments disclosed herein.

Some embodiments of the present disclosure are directed to an electricity storage device which can be used for any of the above-mentioned applications or functions. Depending on which application is chosen may determine some of the overall design parameters, but the system architecture is applicable to all applications. Some embodiments of the present disclosure store electrical energy as both gravitational potential energy and kinetic energy when there is a surplus of power on the grid. Then, the kinetic and potential energy is converted back to electricity when the there is excess demand on the grid. As described herein, at least some embodiments of the energy storage device disclosed herein perform at least three functions important to energy grids: charging, discharging, and providing frequency regulation.

Regarding charging, while certain embodiments of the system may not store electrical "charge," per se (although certain embodiments may include electrical storage devices, such as large scale battery farms), the notion of "charging" the energy storage device like a battery is a useful analogy. "Charging" the system refers to converting input energy into a stored form to be recovered later. Some embodiments of the energy storage device can be said to be in a fully charged state when no more energy can be stored, and in a fully discharged state when no more energy can be extracted from or generated by the system.

FIG. 1A is a graphical representation of example electricity prices, state of charge and operational modes of some embodiments of energy storage devices disclosed herein, and power generation and consumption of some embodiments of energy storage devices disclosed herein over a 24 hour period. When the system is scheduled for charging, (e.g., as determined through market data received from the grid operator, as discussed elsewhere herein, and/or via a pre-arranged agreement to charge and supply power), some embodiments of the control system can be configured to send a signal to a power electronics module to begin drawing power, in the form of electricity, from the grid. This electricity can be used to drive an electric motor, which can be configured to drive a shaft or other mechanism that can rotate a hoist or, as described with reference to some of the embodiments, the motor can pull a cable over a pulley system.

In these example configurations, a cable attached to the hoist or running over the pulley system can raise a mass from a lower elevation to a higher one, thereby converting the electrical energy to mechanical energy, and then to gravitational potential energy. In some embodiments, the height difference between the upper elevation position and the lower elevation position can be between approximately 400 feet (121.92 meters) and 600 feet (182.88 meters). However, some embodiments of the energy storage system may be suitable for smaller or larger elevation changes. Additionally, slopes having an angle of 30 degrees, or greater or lower angles, may be used for the energy storage devices. Certain embodiments use substantially naturally occurring slopes of about 30 degrees or within the range of 25 degrees to 35 degrees. However, as mentioned, any suitable angle, slope, or cliff can be used. For example, an angle of about 10 degrees, 45 degrees, or 90 degrees can be used. In many situations, the steeper the angle, the better the energy storage capacity (assuming the amount of mass being moved is constant). However, naturally occurring geographic features (e.g., cliffs) of sufficient height and at a very steep (e.g., 90 degrees) angle may be substantially rarer than naturally occurring geographic features (such as hillsides) at lesser angles.

When the system is scheduled for discharging (e.g., as determined through market data received from the grid operator and/or via a pre-arranged agreement to charge and supply power), the control system can be configured to send a signal to the power electronics module to begin sending power to the grid. In operation, this can be achieved using the following example process. The control system can cause the mass to descend from one elevation to another, lower elevation, thereby converting gravitational potential energy in the mass to mechanical energy that can rotate or otherwise work the motor/power generator and thereby generate electricity. The motor/power generator can be connected to the cable via the hoist, pulley, and/or cable (which may be in the form of a fabric cable, rubber cable, stranded metal cable, chain cable, or other type of cable). The electricity can be converted in the power electronics module or other suitable component to the correct conditions necessary for the grid.

Regarding frequency regulation, when the energy storage device is scheduled or configured for providing frequency regulation, in some embodiments, the control system can receive a signal from the grid operator as to what the level of instantaneous requested power is. This signal can come in the form of a percent of maximum power capacity available for frequency regulation or can be specified as specific energy unit(s). The control system can send a signal indicating to the power electronics module the desired power (e.g., the optimal desired power) to produce so as to most closely match the grid operator request or so as to match the grid operator request within a tolerance specified by the grid operator or other entity. This desired power level may be a function both of the requested power and the current system operating conditions (state of charge, mass velocity and acceleration, as well as other parameters in certain instances).

One non-limiting example of a calculation used to determine the desired power level is discussed below, and is identified as the "Desired Power Level Calculation." Based on this signal, the power electronics module can either command the system to consume or produce power, as specified in the charging and discharging descriptions above. As the system parameters change, with respect to the commanded signal, the control system can calculate a new desired power level to substantially continually adjust to the changing signal from the grid, and the changing system conditions of the device.

One difference between at least some embodiments of this disclosure and existing conventional suppliers of frequency regulation is the ability of some embodiments of the energy storage device to quickly provide frequency regulation service during periods where the energy storage device is neither currently charging nor discharging, as well as the ability to earn revenue from providing energy arbitrage. For example, certain conventional hydroelectric dams can provide frequency regulation service while producing electricity. However, during times that the dam is not producing at least a substantial amount of bulk power, it typically cannot provide regulation services either.

Likewise, for coal plants and natural gas generators, they can only provide frequency regulation when they are producing power using a substantial percentage of their capacity. It takes a substantial amount of time for such coal plants and natural gas generators to start producing power ("come online") from a quiescent ("off") state, and it is not economical or efficient to run such coal plants and natural gas generators at less than a high percentage of their capacity or outside their design range, and therefore operating at less than near full capacity uses more fuel (per amount of energy produced), increases maintenance costs, and reduces lifetime. On the other hand, conventional flywheel storage technology (where energy is stored as the kinetic energy of the flywheel disk) can provide frequency regulation service continuously (as they offer a quick response time), but because of the small amount of energy that they store, they cannot earn revenue by providing energy arbitrage, that is, they cannot produce large amounts of power for a substantial period of time. Any of these technologies can be used in conjunction with the example embodiments of the energy storage devices disclosed herein.

At least some energy storage device embodiments disclosed herein are unique in that such embodiments can provide frequency regulation continuously, like a flywheel, yet also produce bulk energy, earning energy arbitrage revenue (e.g., where energy may be purchased via the grid and stored during an off-peak period, when energy is relatively less expensive, and then sold to the grid during peak periods at a higher price, to thereby generate net revenues), like a natural gas or coal generator.

During a given period (e.g., a 24 hour period), any of the energy storage device embodiments disclosed herein may be subjected to several operational modes, including, without limitation, an off-peak mode, a mid peak mode, a peak mode, and, again, a mid peak mode. During the off-peak mode (e.g., such as when people tend to be asleep and businesses tend to be closed), electricity prices are generally the lowest. The energy storage device can be configured to purchase electricity during this mode and to convert the input, low cost energy to gravity-based potential energy, up to the maximum storage capacity of the device. During this time, if economically beneficial, some portion of the charging capacity can be allocated to provide frequency regulation services to the grid.

During the mid peak mode, electricity prices are generally not at their peak. Because of the design of certain embodiments, the full power capacity of the energy storage device can be offered as frequency regulation services. This is different from the capability of pumped hydro, compressed air energy storage, or other generation technologies, which generally cannot offer frequency regulation unless they are also generating electricity as a sufficient baseline for efficient plant operation (which may be at a substantial portion of their capacity). Frequency regulation, on average, does not substantially produce or consume a net amount of energy over a given time period and thus the amount of energy stored at the end of the midpeak period is equal to the amount of energy stored at the end of the offpeak period, minus system losses.

During the peak energy mode (e.g., when people are consuming peak amounts of energy, such as when they are awake, working, and heating or cooling their workplaces or residences), electricity prices are generally at the highest level. The energy storage device can be configured to produce power through conversion on the stored potential energy to electricity. This electricity can then be sold to the grid. If economical, any of the storage device embodiments disclosed herein energy can also provide frequency regulation service during this period. Returning again to mid peak mode, the final midpeak period is similar to the first midpeak period, in that the energy storage device can be configured to provide frequency regulation services for its full power capacity during this time.

In embodiments disclosed herein, mass used for the energy storage device can be a solid material such as rock, gravel, dirt, sand, pulverized asphalt or concrete, mine tailings, ice, snow, water, snow, ice and/or any other man-made or natural occurring material or substance. Wind and rain may cause dust, dirt, sand, water, and/or constituents to be added to one or more mass piles or to the mass generally. Therefore, in some embodiments, the mass used for the energy storage device can be a combination of materials and/or substances, and may not be free from moisture. Accordingly, in some embodiments, the mass pile can comprise primarily rock, gravel, dirt, sand, pulverized asphalt or concrete, mine tailings, and a combination of the foregoing.

For example, the mass pile can comprise approximately 95% or more by weight of at least one of dirt, gravel, sand, rock, and a combination of the foregoing. In some embodiments, the mass pile can comprise approximately 85% or more by weight of at least one of dirt, gravel, sand, rock, and a combination of the foregoing. In some embodiments, the mass pile can comprise approximately 75% or more by weight of at least one of dirt, gravel, sand, rock, and a combination of the foregoing. In some embodiments, the mass medium can be primarily a non-liquid. For example, the mass medium can be approximately 95% or more by weight non-liquid, approximately 90% or more by weight non-liquid, approximately 80% or more by weight non-liquid, approximately 70% or more by weight non-liquid, or otherwise.

Economical materials, such as those already existing at a site or location, may be preferred from a cost standpoint. For example, at certain sites, rock, gravel, dirt, and/or mine tailings may be locally available. Such solid material (also referred to herein as mass medium or just medium) can be transported from one elevation to another to store and generate energy. In some embodiments, the solid material can be attached to or supported by a cable, bucket, container or other carrier. A haul rope, cable, and/or a system of pulleys can be used to transfer the kinetic energy of the moving masses to an electric motor/generator. In some embodiments, the motor/generator can be reversible. This near-rigid transfer of power from the mass to the haul rope to the pulleys to the generator can result in the transfer energy with high roundtrip efficiency. Advantageously, in contrast to hydro-energy storage systems, certain embodiments do not require water reservoirs configured to hold water to be raised or lowered in order to produce power. Indeed, certain embodiments do not require the movement of large volumes of water in order to produce power at all.

To improve the appropriateness and efficiency of the energy storage device for bulk energy storage, it may be beneficial to size the amount of weight being stored to be sufficiently large. Likewise, to improve the applicability and efficiency of the energy storage device to serve the frequency regulation market, it may be beneficial to configure the control system and power electronics to allow for rapid charging and discharging to the grid.

Figure 1B:
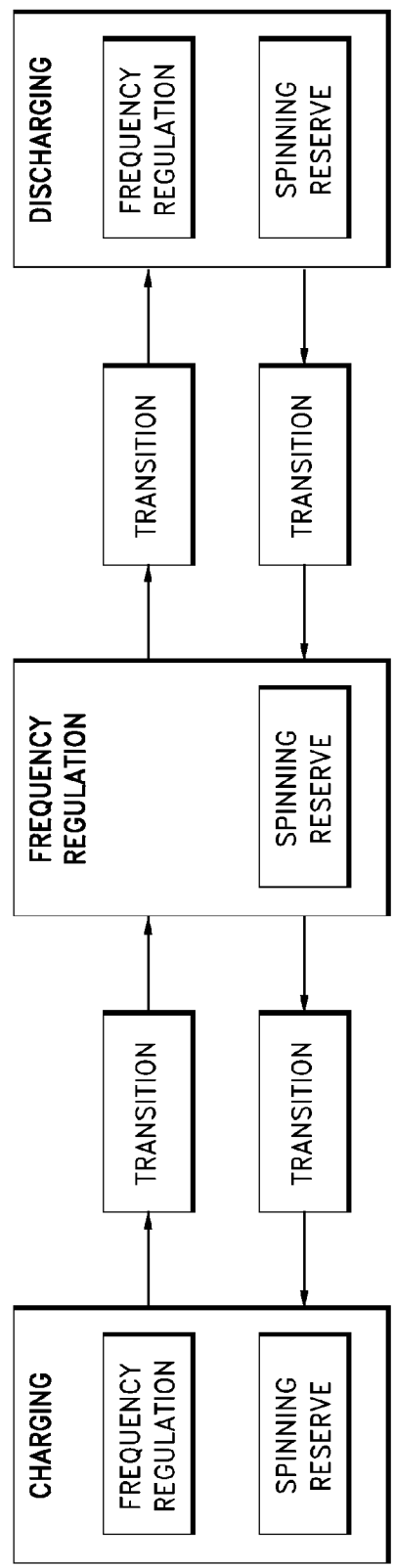
FIG. 1B is a graphical representation of the operational modes of an example energy storage device, the operation modes corresponding to various energy-related services offered by the energy storage device.

FIG. 1B is a representation of different operating modes that will typically be followed by some embodiments of the energy storage devices disclosed herein. As also illustrated in FIG. 1A, the typical modes of operation for certain example embodiments will take advantage of periodic price shifts in the electricity market. While a 24 hour cycle is very common, embodiments disclosed herein also applicable to any electricity market that has periodic price swings (with a period that is different than 24 hours).

The baseline operation during this period, and that which provides bulk energy storage, is to completely charge (or charge at other significant levels of capacity) an energy storage device during periods of low electricity prices and to discharge completely (or discharge other significant levels of capacity) during high electricity prices. These modes are labeled the "Charging" and "Discharging" periods.

Layered on top of this operation is the ability to provide frequency regulation to the grid. A portion of the power capacity of the device (either while charging or discharging) can be allocated to frequency regulation. The allocation between frequency regulation and bulk charging/discharging may, in certain embodiments, depend on both the prices for frequency regulation and the prices for electricity. However, during periods where the storage device is neither charging, nor discharging (labeled "Midpeak" in FIG. 1A), certain embodiments of the storage device can provide up to twice its maximum power capacity as frequency regulation. These modes are labeled the "Frequency Regulation" period.

In addition, it is possible that there are periods where neither charging/discharging, nor frequency regulation are economic or otherwise desirable. During these periods, neither charging/discharging or frequency regulation will be performed. These periods are labeled "Transition".

Finally, separate from any of these operations, certain embodiments of the storage device can offer to provide other ancillary services, such as non-spinning reserve, spinning reserve, and others. In certain embodiments, these services may be additional to any of the above activities, and some or all of these ancillary services may be offered as long as sufficient power capacity from the device is reserved. Due to typical pricing structures of electricity and frequency regulation, the amount of other ancillary services provided by the storage device will be secondary in certain example embodiments. These additional ancillary services are represented by the label "Spinning Reserve".

In certain embodiments, the decision as to when each mode starts and ends, transitioning into the following mode, is made by examining a number of factors to predict market pricing. In markets where market pricing is not transparent, the operation of certain embodiments of the storage device, through some or all of these various modes, may be set by the grid operator/electric utility.

Figure 2A:
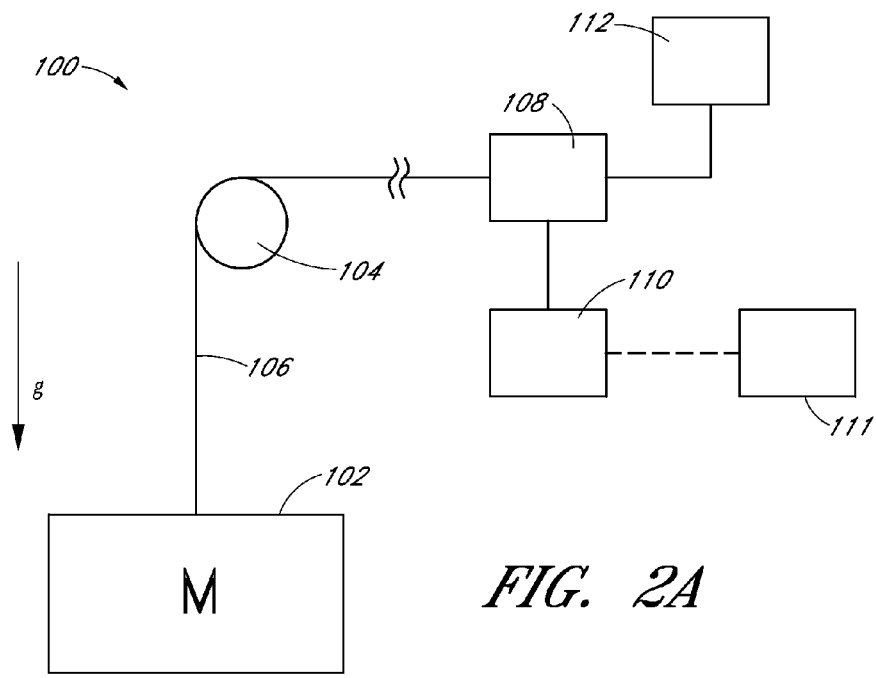
FIG. 2A is a side view of an example embodiment of an energy storage device.
Figure 2B:
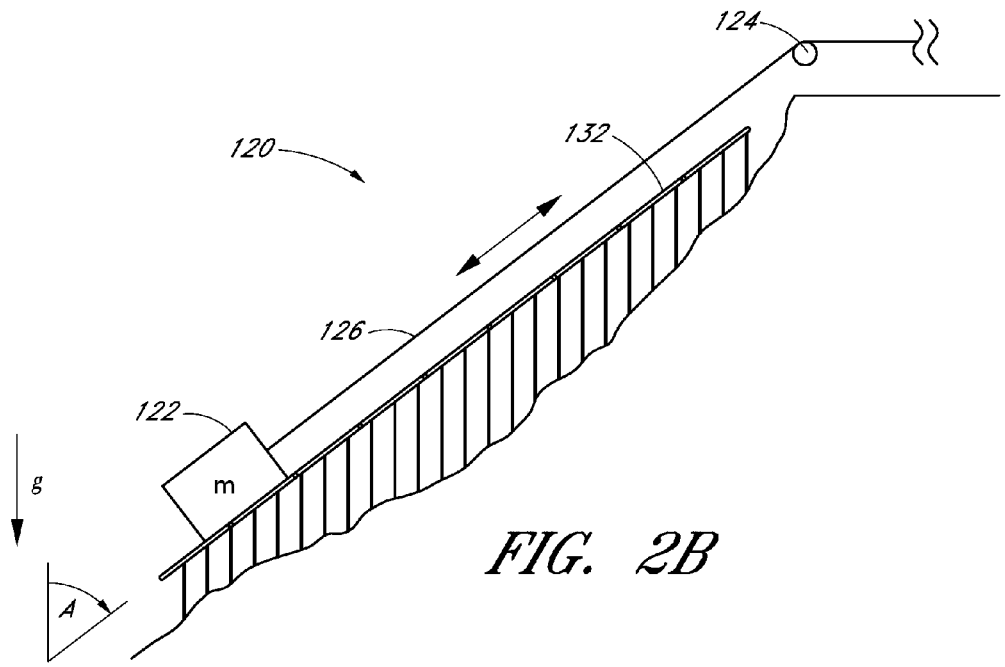
FIG. 2B is a side view of another example embodiment of an energy storage device.
Figure 3A:
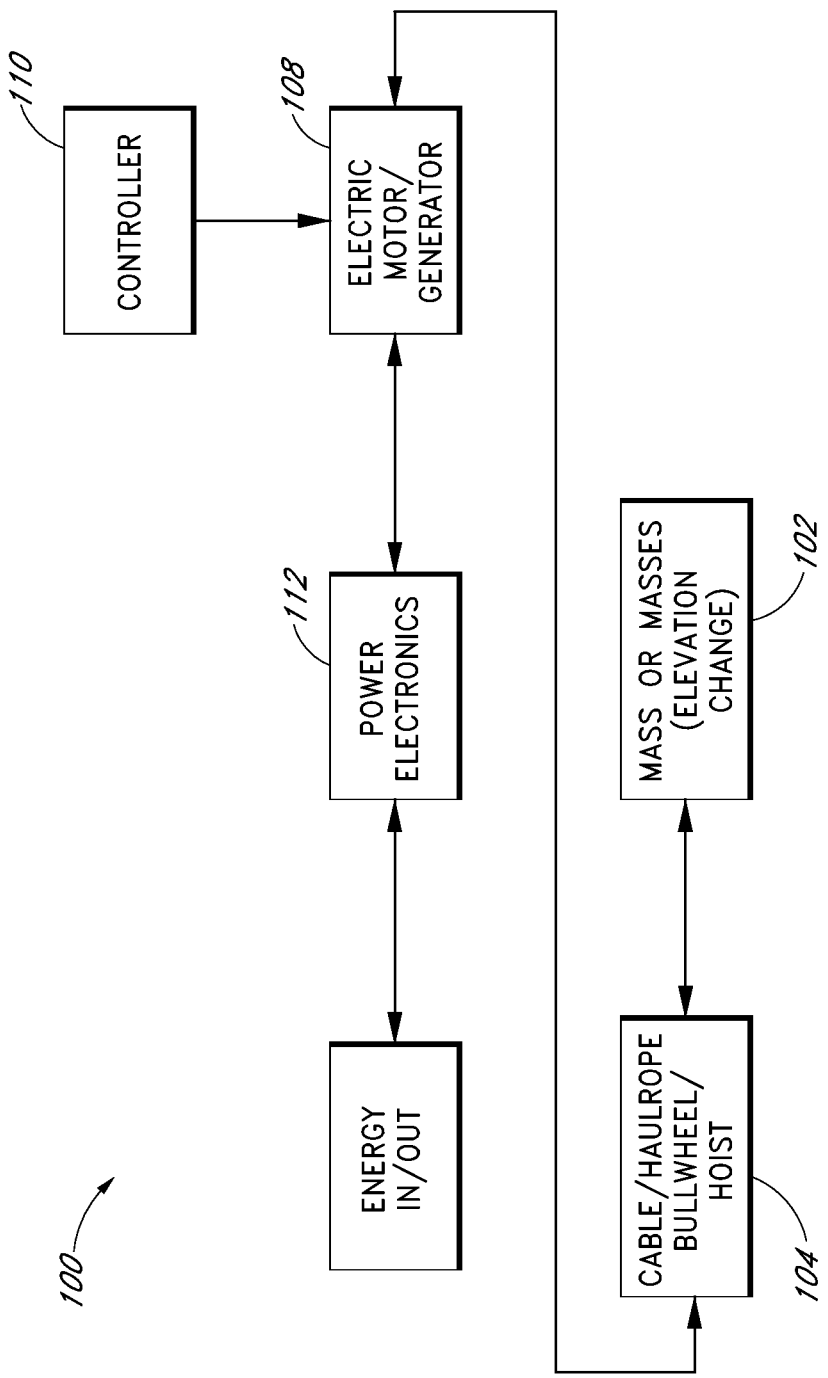
FIG. 3A is a first schematic representation of an example embodiment of an energy storage device.
Figure 3B:
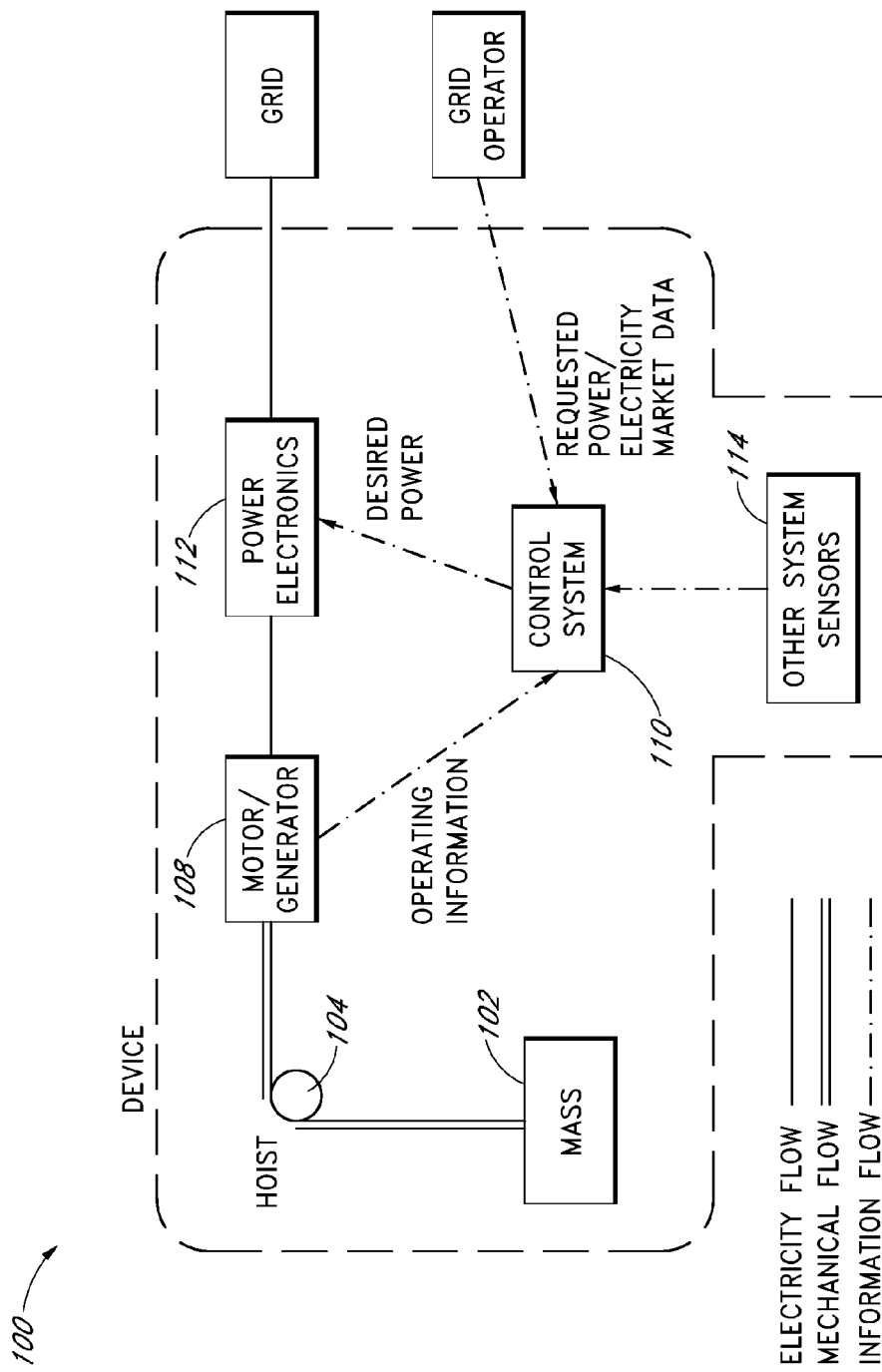
FIG. 3B is a second schematic representation of an example embodiment of an energy storage device.

An example or embodiment of an energy storage device 100 is illustrated in FIG. 2A, the energy storage device 100 having a mass 102, a hoist 104 (which can also be or have a pulley), and a cable 106. FIG. 2B is a side view of another embodiment of an energy storage device 120. FIGS. 3A and 3B are schematic representations or flow charts of some of the components that can comprise some energy storage device embodiments disclosed herein, including without limitation the embodiment of the energy storage device 100 illustrated in FIGS. 2A and 2B.

The cable 106 can be a rope, chain, steel cable, or any other similar appropriate material or object capable of providing tensile support to the mass or masses 102 that can be moved from one elevation to another. In the illustrated example embodiment, the energy storage device 100 is configured such that mass 102 can be supported by an end portion of the cable 106, but is otherwise only subjected generally to the force of gravity (g) (and possibly wind). The hoist 104 can be configured to alter the direction of the cable 106 and can provide a guide mechanism for the cable 106.

The energy storage device 100 can also have a motor/power generator 108 in communication with the cable, the power generator 108 being configured to raise the level of the mass 102 to store energy (in the form of potential energy). As described, the power generator 108 can be configured to draw power from the energy grid in order to raise the mass 102 during off-peak energy consumption periods of time (or at other times, as desired). The energy storage device 100 can also be configured to produce energy to the grid by permitting the mass 102 to fall or be lowered, thereby creating kinetic energy. The power generator 108 can generate energy that can be fed into the energy grid as the mass 102 is falling and producing kinetic energy. The energy produced by the energy storage device 100 can be fed into the grid during, for example and without limitation, periods of peak energy consumption.

The motor/power generator 108 can be attached to an end of the cable 106, or the cable can form a continuous loop around the hoist 104, around a pulley within or powered by the power generator 108 and to the mass 102, if, for example, another pulley or hoist 104 were positioned beneath the mass 102. Alternatively, the power generator 108 can be positioned or configured to be in direct contact with the hoist 104. Some embodiments, this can be achieved by coiling the length of the cable 106 either helically or otherwise around the hoist or pulley 104.

The energy storage device 100 may include a control system 110 configured to control the motor/power generator 108 and, hence, the position, speed, and direction of motion of the mass 102 and, accordingly, whether energy is being stored or generated and the magnitude of the energy being stored or generated. The control system 110 can have electronic and/or manual controls to control the motor/power generator 108 and/or can be pre-programmed with computer software or algorithms for such control. The motor/power generator 108 can be connected to a power electronics module 112 that can convert the electricity produced by the motor/power generator 108 into a form that is suitable for feeding into the power grid.

Additionally, in some embodiments, the energy storage device 100 or any other energy storage device embodiment disclosed herein can have one or more sensors 111 that can provide data signals or other feedback or information to the control system 110, to a user through a display or otherwise, to a data recorder, or to an alarm system, or otherwise. For example, without limitation, the sensors 111 can be configured to monitor line velocity, acceleration, or direction, mass on the line or in particular carriages, total mass in a storage location, spacing between removable or non-removable masses or any other desired system parameters.

As mentioned, FIG. 2B is a side view of another embodiment of an energy storage device 120. In some embodiments, with reference to FIG. 2B, the mass 122 can be supported on an angled surface (having an angle A), such as the support surface 132 illustrated therein. In this configuration, the mass can be connected to a cable 126 that is routed over a pulley 124. The cable 126 can be connected at the other end to a motor/power generator 128 (not illustrated) which can be controlled by a control system (130). The support surface can be positioned along an angled surface, which can be a naturally occurring hill or other slope, and can be configured to provide a smooth, low friction weight-bearing surface to the mass 122. Additionally, in some embodiments, the mass 122 and/or support surface 132 can have wheels or rollers thereon to limit the friction, resistance, or other energy loss when the mass 122 is moved either up or down the support surface 132.

Referring again to FIGS. 3A and 3B, as illustrated in FIG. 3A, and as similarly described elsewhere herein, based on one or more inputs (e.g., a preprogrammed schedule, a request for bulk power or frequency regulation from a power grid operator, etc.) a controller 110 controls an electric motor/generator 108 and optionally a separate braking mechanism (not shown), to control the hoist 104 to change the elevation of the mass(es) 102. The controller 110 may receive feedback from the motor/generator (e.g., the amount of power being generated or consumed, the motor RPM, etc.). When operating in a power generation mode (when lowering the mass(es) 102), the motor/generator 108 provides power to power electronics 112, which is then output to the grid. When operating in a power storage mode (when raising the mass(es) 102), the motor/generator 108 receives power from power electronics 112 which the power electronics 112 receives from the grid.

FIG. 3B illustrates the flow of electricity, information, and the mechanical flow with respect to the system 100. As illustrated, a grid operator transmits (e.g., from a computer system associated with the grid operator, over a network, such as the Internet, to a computer system associated with or included in the system 100) a request for power/electricity or frequency regulation to the control system 110. The request may include a price being offered for units of power and/or for an amount of frequency regulation. The offer may specify a minimum and/or maximum amount of power to be supplied and/or a tolerance range for the frequency regulation. If frequency regulation is being provided by the device, the information from the grid operator may include the required or requested changes in power consumption/production during the period in which frequency regulation is being provided. In addition, the control system 110 may access electricity market data (e.g., the amount being charged and/or offered for power or frequency regulation for different periods of time, such as at peak, mid-peak, and off peak periods of time). Optionally, in addition to or instead of receiving a request from the grid operator, the process may monitor (via one or more data feeds received over the network from one or more data sources) historical, current and/or anticipated future prices of energy, frequency regulation, spinning reserves and/or non-spinning reserves. The control system 110 may utilize the market data to determine whether or not to generate or store energy and/or whether or not to perform frequency regulation (and/or other ancillary services) in accordance with the request and/or in response to the data monitoring. The control system 110 may transmit an acceptance of the offer or a refusal to the grid operator or may supply energy and/or ancillary services without transmitting over the network an acceptance or refusal.

The control system 110 may operate the motor 108 and the power electronics 112 as similarly discussed above with respect to FIG. 3B. The motor/generator 108 raises or lower the mass(es) 102 to thereby store or generate electricity, as described above. To improve control, the device may use additional system sensors 114 including some or all of the following: a tension sensor to measure the tension on the line or cable (which may provide an indication as to the total mass on the line), a mass sensor to determine the mass of each bucket, mass sensors to measure the quantity of material stored in the pile, position sensors to confirm the position of the weights during loading and unloading, as well as position sensors to determine the valve opening position, and force sensors to monitor the force needed to open or close the valve for dispensing material into the buckets.

Figure 4:
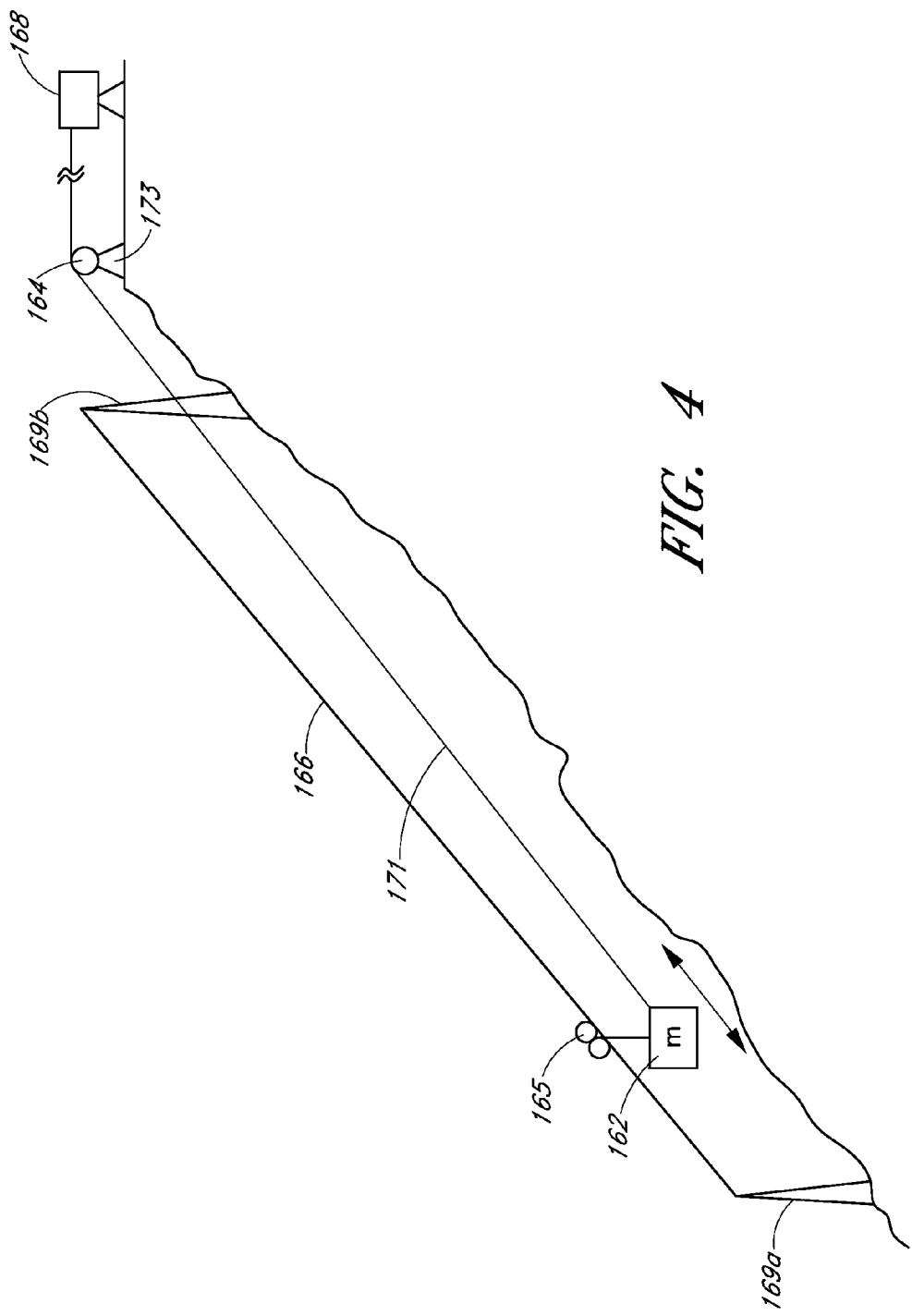
FIG. 4 is a side view of an example embodiment of an energy storage device.

FIG. 4 is a side view of an embodiment of an energy storage device 160. In some embodiments, with reference to FIG. 4, one or more masses 162 (one being shown) can be supported by a cable system 166 supported along a sloping surface or hillside by a first tower 169a and a second tower 169b. The first tower 169a can be positioned at a lower elevation than the second tower 169b. A second cable or cable system 171 can be routed over one or more pulleys or guide wheels 164 (one being shown) supported by one or more support towers or support members 173 positioned at the top of the slope or along the slope. The second cable 171 can be connected to the motor/power generator 168 such that, when the operator of the energy storage device 160 desires to store energy in the energy storage device 160, the motor 168 retracts the second cable 171 and the mass 162 in a first direction from a lower to a higher elevation to increase the potential energy of the mass 162 and, hence, the energy storage device 160. In contrast, when the operator of the energy storage device 160 desires to produce energy to the grid, motivating power to the motor 168 can be ceased (although power may still be applied for control and monitoring electronics and sensors) and the mass 162 can be permitted to descend down the slope toward the first tower 169a due to the gravitational force exerted on the mass 162. Allowing the mass 162 to descend down the slope will cause the second cable 171 to work the motor/power generator 168 and produce electricity. Optionally, the motor 168 or other breaking mechanism may be used to slow or control the descent to a safe velocity or acceleration.

Figure 5A:
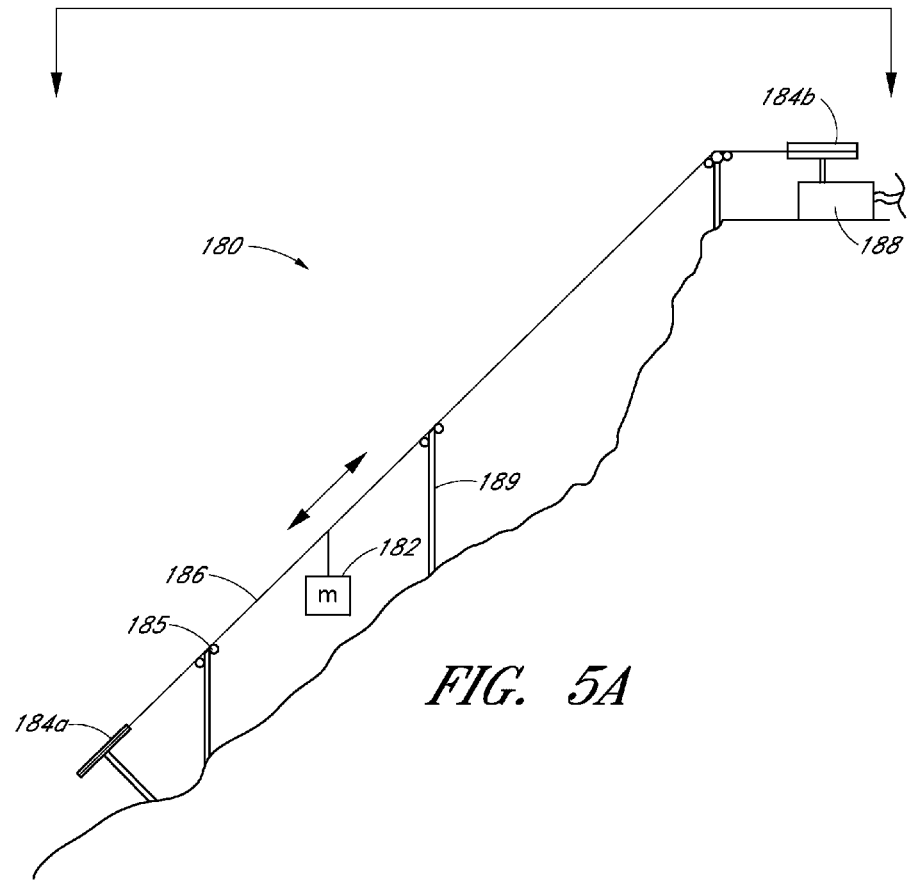
FIG. 5A is a side view of an example embodiment of an energy storage device.
Figure 5B:
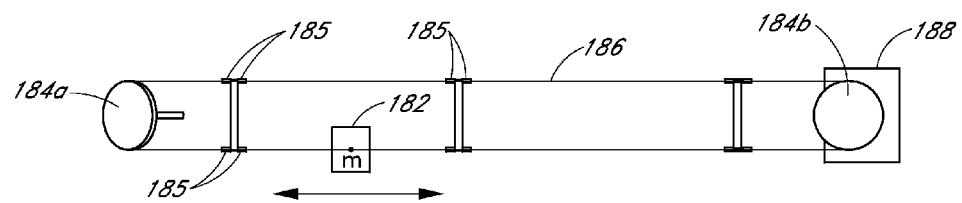
FIG. 5B is a top view of the example embodiment of the energy storage device illustrated in FIG. 5A.

FIGS. 5A and 5B are a side view and a top view, respectively, of an embodiment of an energy storage device 180. In some embodiments, as illustrated in FIGS. 5A and 5B, one or more masses 182 (one being shown) can be removably or non-removably supported by a cable system 186 supported along a sloping surface or hillside by a first pulley 184a (also referred to as a bullwheel or a drive bullwheel) coupled to motor/generator 188, and a second pulley 184b (also referred to as a bullwheel or a return bullwheel). In some embodiments, a plurality of masses 182 can be supported along one-half the length of the cable 186 or along one side of the cable 186. In some embodiments, a plurality of masses 182 can be supported (removably or otherwise) along the entire length of the cable 186. Additionally, in some embodiments, the masses 182 can be mass carriers configured to selectively carry a transportable mass from the lower to the higher elevation, or vice versa. In such a configuration, the energy storage device 180 can have a plurality of mass carriers continuously or at uniform or non-uniform intervals along the cable 186.

Figure 7A:
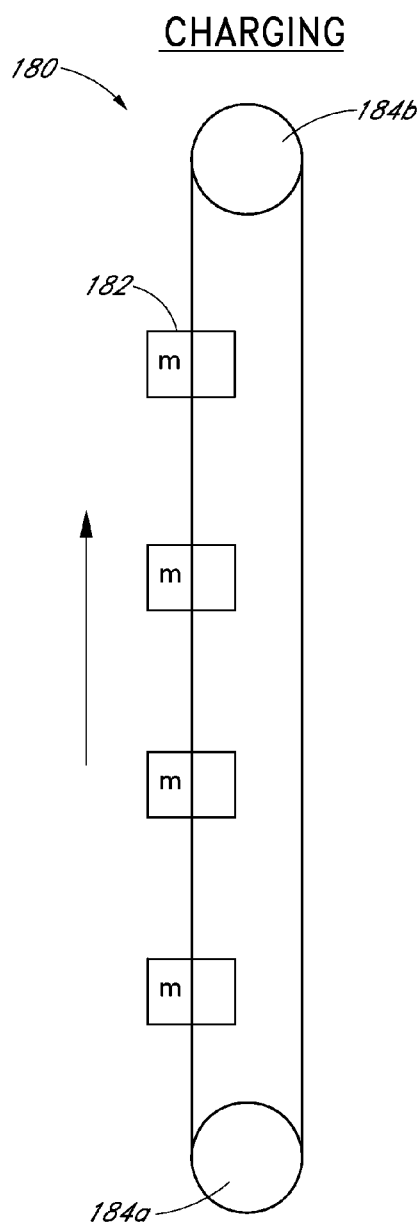
FIG. 7A is an illustration of an example embodiment of an energy storage device, showing the energy storage device in an energy storage or charging mode.

The cable system 186 can be routed over a plurality of smaller pulleys or guide wheels 185 supported by one or more support towers or support members 189 positioned along the slope. The first bullwheel 184a can be positioned at a lower elevation than the second bullwheel 184b. The second bullwheel 184b can be connected to the motor/power generator 188 such that, when the operator of the energy storage device 180 desires to store energy in the energy storage device 180, the motor 188 rotates the second bullwheel 184b in a first direction that causes the mass 182 to be pulled up the slope to increase the potential energy of the energy storage device 180, as illustrated in FIG. 7A (showing multiple masses 182). For some embodiments disclosed herein, using multiple masses, as illustrated in FIG. 7A, can permit more total mass to be used, optionally in smaller, easier to handle units, increasing the amount of energy that can be stored in an energy storage device, while reducing the structural requirements of the energy storage device and the device holding the masses (e.g., gravel or sand containers). In some embodiments, the masses can be located along only one side of the cable, the cable direction being reversible. In some embodiments, the cable can be operated in a single direction during some or all of the operation, such that the masses switch sides during operation.

Figure 7B:
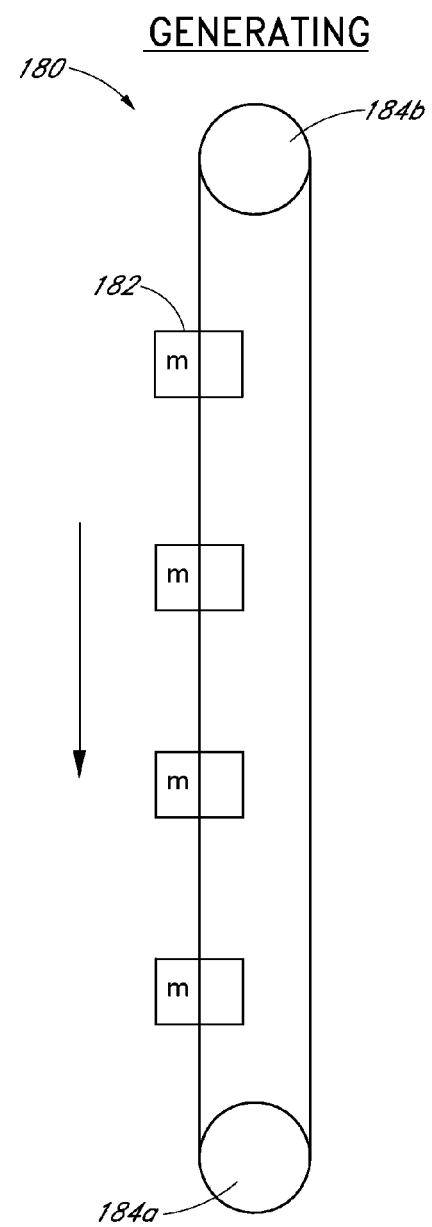
FIG. 7B is an illustration of the example embodiment of an energy storage device shown in FIG. 7A, showing the energy storage device in an energy generating mode.

In contrast, when the operator of the energy storage device 180 desires to produce energy to the grid, power to the motor 188 can be ceased and the mass 182 can be permitted to descend down the slope toward the first bullwheel 184a due to the gravitational force exerted on the mass 182, as illustrated in FIG. 7B. Optionally, the motor 188 or other breaking mechanism may be used to slow or control the descent to a safe velocity or acceleration. Allowing the mass 182 to descend down the slope will cause the cable system 186 to exert a torque on the second bullwheel 184b, thereby working the motor/power generator 188 and producing electricity. Any of the energy storage device embodiments disclosed herein, including the energy storage device 180, can be configured for use along any desired slope, even a slope that is near or equal to a vertical pitch, or any slope between vertical and horizontal pitches such as between approximately thirty degrees and approximately forty degrees, without limitation. Steeper slopes may provide performance and efficiency benefits. In some embodiments, the masses can be rotated all the way around the loop of cable such that fewer or no directional changes would be required.

Figure 6:
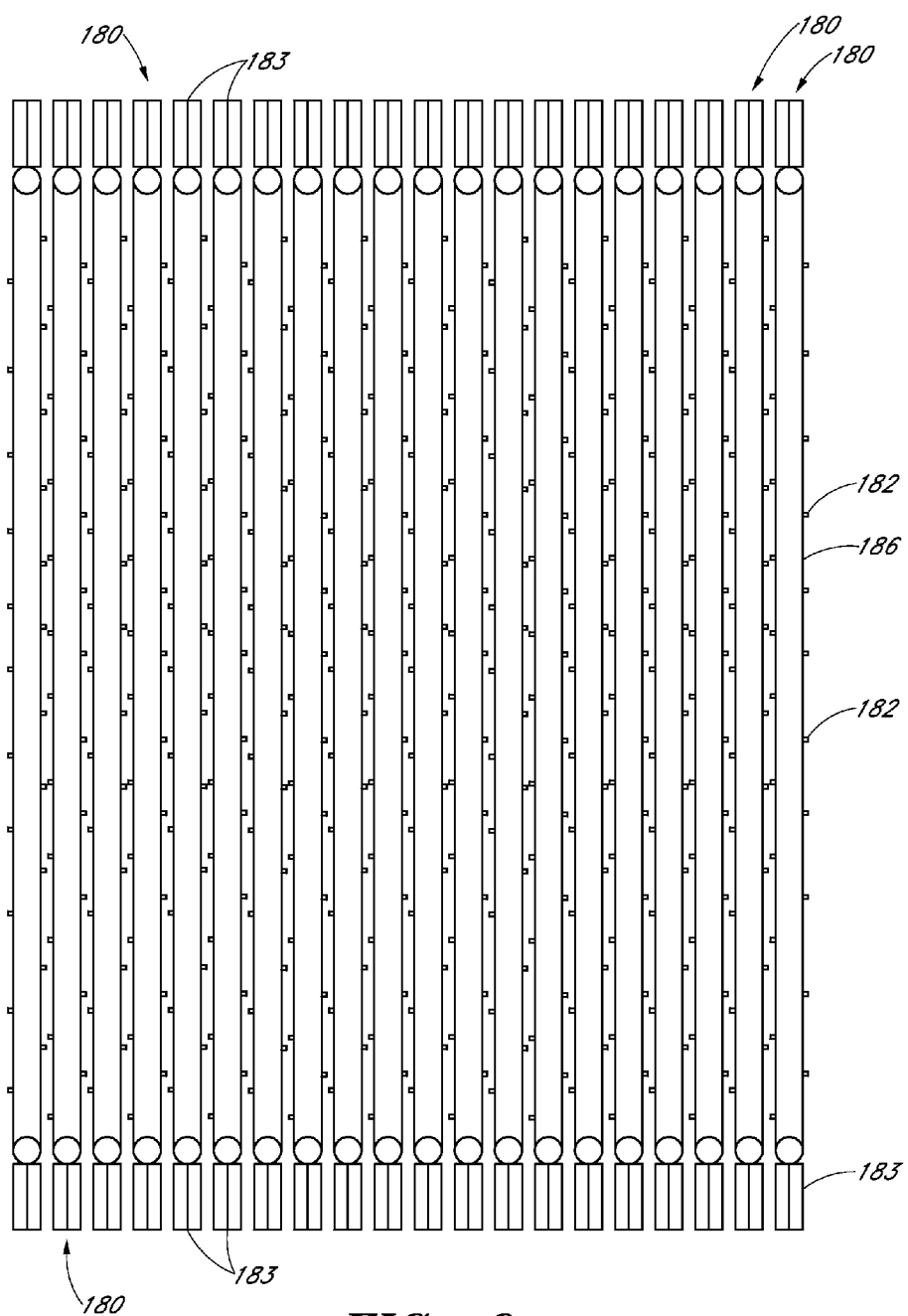
FIG. 6 is a top view of an array of example energy storage device embodiments.

FIG. 6 is a top view schematic illustration of a plurality of energy storage devices 180, each supporting a plurality of masses 182. With reference to FIG. 6, in some embodiments, a plurality of energy storage devices 180 can be arranged along a slope or hillside (or, in some embodiments, a cliff or other vertically or steeply sloped surface) to provide a greater cumulative amount of energy storage. Each of the plurality of energy storage devices 180 illustrated in the embodiment of FIG. 6 can be configured such that masses 182 can be stored in and removed from the storage containers 183 and added to the cable or line 186. Each energy storage device 180 can be operated independently of the other energy storage devices 180.

In some embodiments, the masses 182 can be removably or non-removably supported by the cable 186. Further, the first masses 182 can comprises carriers that can be each configured to move a desired amount of mass from the lower to the higher elevation to, for example, store energy, or from the higher elevation to the lower elevation to, for example, create energy. The carriers can be positioned about the entire length of the cable 186 and can be controlled and configured to such that each carrier is independently loadable with mass or such that each carrier can independent support and discharge the mass. For example, for any of the energy storage device embodiments disclosed herein, the carriers could be a plurality of hooks, buckets, nets, or other support members positioned along the length of the cable 186 wherein discrete masses or mass medium such as dirt, sand, rock, gravel, crushed concrete, trash or refuse, liquid, hazardous waste such as spent nuclear fuel, non-hazardous waste, or other substances or materials could loaded into and removed from the carriers at both the highest and lowest elevations, or at any elevation along the path of the carriers.

Some embodiments of the energy storage device 180 or any other energy storage device embodiment disclosed herein, the carriers can be located on one or both sides of the cable and can be positioned continuously or at uniform or non-uniform intervals along the length of the cable. The energy storage device 180 or any other energy storage device embodiment disclosed herein can be configured such that the cable velocity is reversible, such that the cable speed and acceleration are adjustable, and/or such that the masses can be removed or adjusted in magnitude. Any energy storage device embodiments disclosed herein can be configured such that the cable direction is uni-directional or reversible.

In some embodiments, some of the energy storage device embodiments can be operated such that the majority of the mass supported by a given cable is generally supported on only one side of the cable or cable loop at a given time. For example, some of the energy storage device embodiments can be operated such that the 95% or more of the removable mass supported by the cable (i.e., not considering the non-removable components, such as the cable itself, the mass carriers, or other components that may be non-removably supported by the cable) is supported on one side of the cable at a given time during operation. Some of the energy storage device embodiments can be operated such that the 85% or more, or 75% or more, of the removable mass supported by the cable is supported on one side of the cable at a given time during operation.

Figures 8A, 8B:
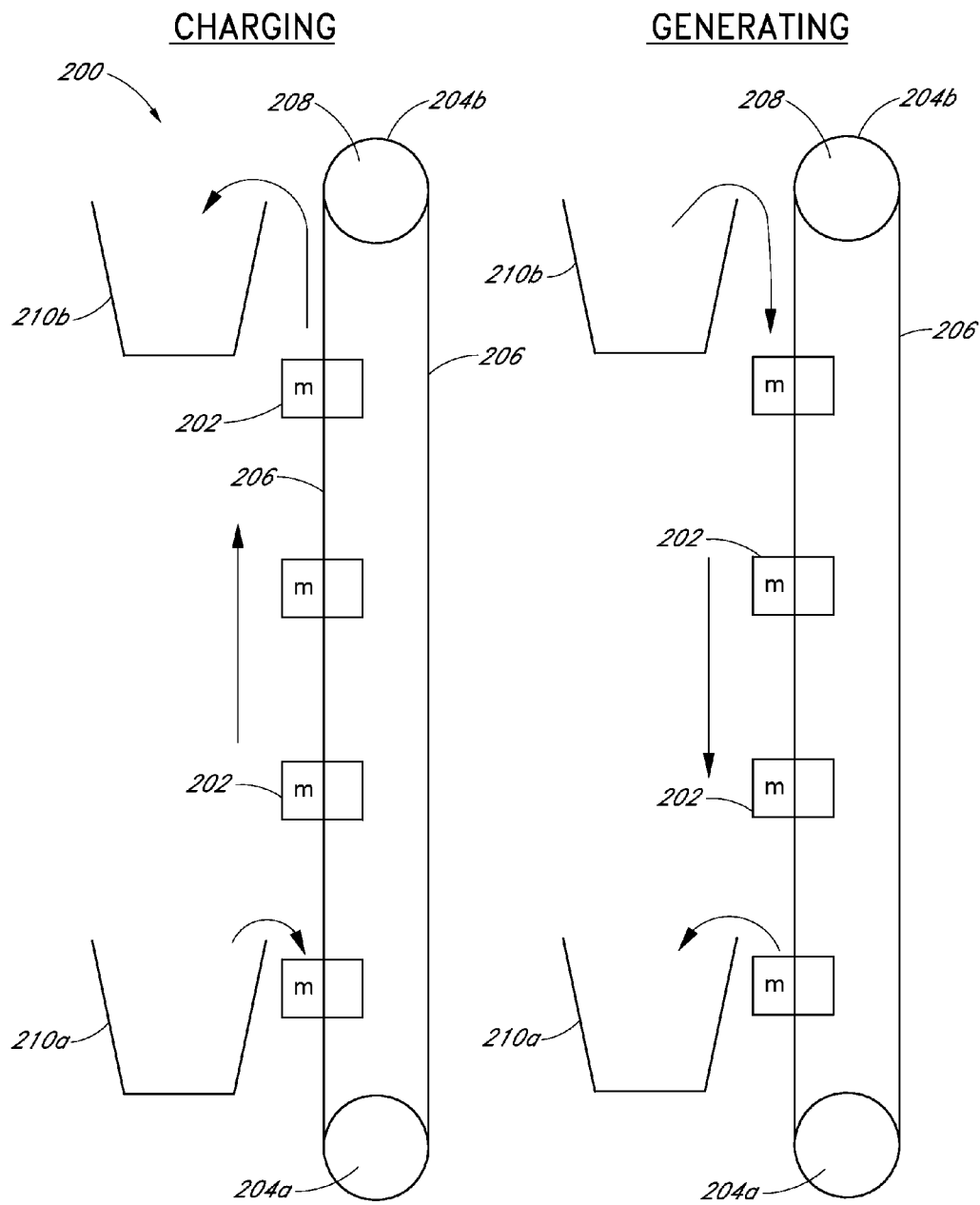
FIG. 8A is an illustration of an example embodiment of an energy storage device, showing the energy storage device in an energy storage or charging mode.
FIG. 8B is an illustration of the example embodiment of an energy storage device shown in FIG. 8A, showing the energy storage device in an energy generating mode.

FIG. 8A is an illustration of an embodiment of an energy storage device 200, showing the energy storage device 200 in an energy storage mode. FIG. 8B is an illustration of the embodiment of the energy storage device 200 shown in FIG. 8A, showing the energy storage device 200 in an energy generating mode. Some embodiments of the energy storage device 200 can have any of the components, features, or other details of any other energy storage device embodiments disclosed herein, and can be oriented at any desired angle or slope. In some embodiments, one or more masses 202 can be supported by a cable system 206 supported along a sloping surface or hillside by a first pulley 204a (also referred to as a first bullwheel) and a second pulley 204b (also referred to as a second bullwheel). In some embodiments, a plurality of masses 202 can be supported along one side of the cable 206 (as illustrated) or along both sides of the cable 206 (not illustrated).

The cable system 206 can be routed over a plurality of smaller pulleys or guide wheels supported by one or more support towers or support members (not illustrated) positioned along the slope. If the energy storage device 200 is vertically oriented, support towers may be omitted. The first bullwheel 204a can be positioned at a lower elevation than the second bullwheel 204b. As with previous embodiments, the second bullwheel 204b can be connected to the motor/power generator 208 such that, when the operator of the energy storage device 200 desires to store energy in the energy storage device 200, the motor 208 rotates the second bullwheel 204b in a first direction that causes the mass 202 to be pulled up the slope to increase the potential energy of the energy storage device 200, as illustrated in FIG. 8A. FIG. 8A shows multiple masses 202 being transferred to a higher elevation. For some embodiments disclosed herein, using multiple masses, as illustrated in FIG. 8A, can permit more mass to be used, increasing the amount of energy that can be stored in an energy storage device, while reducing the structural requirements of the energy storage device.

Furthermore, the masses 202 can be adjustable, changeable, and/or removable. Additionally, the spacing between the masses supported by the cable 206, or any other cable disclosed herein, can be changed. For example, a first container 210a can be positioned at or near the bottom or lower portion of the energy storage device, and a second container 210b can be positioned at or near the top or upper portion of the energy storage device. The energy storage device 200 can be configured such that the mass contained or supported along the cable 206 can be partially or fully transferred from the first storage container 210a onto the cable 206 (or into a bucket or container supported by the cable 206), pulled up to the higher elevation, and transferred into the second storage container 210b during the power storage mode (illustrated in FIG. 8A).

In any of the energy storage device embodiments disclosed herein, mass can be added to or removed from the system or the cable at any position along the length of the cable. Similarly, storage containers can be positioned at any position along the length of the cable. For example, mass can be loaded to or unloaded from the cable at the midpoint between the upper and lower elevations.

In contrast, when the operator of the energy storage device 200 desires to produce energy to the grid, power to the motor 208 can be ceased and mass can be transferred from the upper storage container 210b onto the cable system 206 whereby gravity can cause the mass to descend down the slope or vertical descent toward the lower elevation, thereby generating power in the motor/generator 208. When the masses reach the lower, first container, the mass can be transferred into the first storage container 210a. In some embodiments, the masses 202 can be removably supported by the cable system 206, wherein the masses are transferred between the storage containers and the cable system. In other embodiments, the cable 206 can support buckets or containers along the length of all or a portion of the cable system, wherein the buckets or containers can each support transferrable mass material, such as dirt, sand, gravel, rocks, water, or any other suitable material.

In any energy storage device embodiments disclosed herein, as mentioned, the masses can be transferred onto or off of the cable or onto or off of the moving portion of the system at an upper and a lower elevation, or any elevation therebetween. For example, any energy storage device embodiment disclosed herein could have a mid elevation having a storage container and being configured to transfer mass to and from the cable or carriers supported thereby and/or to and from the other moving components of the energy storage device. Similarly, any energy storage device embodiments disclosed herein can have one or more motors/power generators positioned at any desired points along the length of the cable. For example, an energy storage device embodiment can have one or more motor/generators at an upper elevation, a lower elevation, a mid or halfway elevation, and/or at any other positions along the length of the cable. One or more pulleys, guides, and other components interacting with the cable system can also be linked to generators and/or motors.

The energy storage device 200 can be configured to transfer mass from the buckets or moveable containers supported by the cable system 206 to the storage containers 210*a*, 210*b* or vice versa, by tipping, spilling, opening, dumping, or otherwise transferring some or all of the contents of the moveable containers into the storage containers 210*a*, 210*b*, or otherwise, releasing material through discharge devices (which can be valves, releasable doors, or otherwise) in the moveable containers into the storage containers 210*a*, 210*b*, or through any suitable means. The discharge devices, which can be valves such as those on a hopper or other medium container, can be controllably adjusted by a control system to control the amount or flow rate of mass medium flowing through the valve or releasable doors. Similarly, the energy storage device 200 can be configured to transfer the mass from the storage containers 210*a*, 210*b* to the moveable containers or containers supported by the cable system 206 by pouring material from the storage containers 210*a*, 210*b* into the moveable containers, by releasing material through valves or releasable doors in the storage containers 210*a*, 210*b* into the moveable containers, by scooping and transferring the material from the storage containers into the moveable containers, or through any other suitable means.

Thus, the carriers or buckets may be loaded with the material via the lower container 210*a*, and then the buckets may be emptied at the upper container 210*b* (and vice versa). After a bucket is emptied, it may be carried via the cable 206 back to the other container to be loaded with additional material, and the process repeats as often as desired. Thus, the upper or lower containers may contain orders of magnitude more material than can be held by the buckets affixed by the cable 206, or that the cable 206 could support. Yet, using the illustrated approach, all of the material may be moved from one container to the other container. This technique greatly reduces the expense and size of the cable 206, associated support towers, and other associated weight bearing components, and provides greater adjustability to the amount of mass supported by the cable and, hence, the amount of speed and kinetic energy in a line.

FIG. 9 is a side view of an embodiment of an energy storage device 300, and FIG. 10 is an enlarged view of a portion of the embodiment of the energy storage device 300 illustrated in FIG. 9. Any of the features, components, or other details regarding the energy storage device 300 can be the same as or similar to any of the features, components, or other details of any other energy storage device disclosed herein. Similarly, any of the features, components, or other details of any energy storage device embodiments disclosed herein can be the same as or similar to any of the features, components, or other details of the energy storage device 300 embodiments disclosed herein.

As will be described in greater detail, in some embodiments, the energy storage device 300 can be configured such that mass can be added and removed from the active components of the system (e.g., to and from the cable system, carriers, and/or other components that exert a force on the motor/power generator or are powered by the motor/power generator), depending on whether the system is producing or storing energy and/or whether the system is being used for energy regulation. For example, mass can be added to and/or removed from a cable 306 linked to a motor/power generator 308, and can be stored at least one of two different elevational positions of the energy storage device 300, depending on whether energy is being stored by the energy storage device (by transferring mass from a lower to a higher elevation) or whether energy is being generated by the energy storage device (by transferring mass from a higher to a lower elevation).

In some embodiments, with reference to FIGS. 9 and 10, one or more masses 302 can be supported by a cable system 306 supported along a sloping surface or hillside by a first pulley 304*a* (also referred to as a first bullwheel) and a second pulley 304*b* (also referred to as a second bullwheel). In some embodiments, a plurality of masses 302 can be supported along one side or both sides of the cable 306. In the embodiment illustrated in FIG. 9, the masses 302 can be supported along both sides of the cable 306, but are illustrated along a portion of the cable for clarity of the drawing. The plurality of masses 302 can each comprise a fillable container 303 supported by the cable. Again, only some of the carriers 303 supported by the cable 306 of the energy storage device 300 are shown in FIG. 9 for clarity. In some embodiments, the masses 302, some or all of which can comprise mass or material carriers 303, can be continuously supported along the entire length of the cable 306.

The carriers 303 can be made from any suitable material, including steel, aluminum, other metal, plastic, composite materials, fiberglass, cloth, rubber, and/or any combination of such materials. The carriers 303 can be supported along the cable 306 such that at least a top perimeter of the carriers 303 each approximately abut one another along the length of the cable 306, at least when the adjacent carriers 303 are at the same elevational position. Additionally, the carriers 303 can be supported by the cable system 306 so that the connection with the cable system projects from a side of the cable system 306 and/or is otherwise configured such that the bullwheel, guides, rollers, and other components of the cable system do not interfere with the movement of the carriers 303. Further, as shown, the carriers 303 can have a round profile beneath the upper edge to permit the carriers 303 to rotate to discharge mass or material 307 without interfering with adjacent carriers 303. Additionally, the rounded or spherical profile of the carriers 303 can reduce the interference between the adjacent carriers 303 as the carriers 303 are traveling up or down the inclined portion of the cable system. Additionally, in some embodiments, the carriers 303 can be compartmentalized to prevent or inhibit gravel from shifting during operation up or down the slope.

As used in this context, the term approximately abutting means that little or no gap is present between each of the carriers 303 when the containers are being filled with mass medium (such as the mass medium 307 illustrated in FIGS. 9-11) so that little or no of the mass medium being added to the containers passes between the carriers 303 when such carriers 303 are being filled to improve the efficiency of mass transfer. As mentioned above, in any of the embodiments disclosed herein, the mass or mass medium used for the energy storage device can be a solid material such as rock, gravel, dirt, mine tailings, sand, ice, snow, water, pulverized asphalt or concrete, or any other man-made or natural occurring material or substance. The transfer of the mass medium to and from the carriers will be described in greater detail below.

Alternatively, the carriers 303 can be supported by the cable 306 at any desired position and in any desired number or spacing along the length of the cable 306. For example, without limitation, the carriers 303 can be spaced such that one or more inches (2.54 or more centimeters) of space is present between two or more or each of the carriers 303, such that one or more feet (0.305 meters or more) of space is present between two or more of the carriers 303, or at even larger intervals.

In some embodiments, the carriers 303 can comprise a continuous flexible netting or sling suspended from the main cable 306 or from a plurality of cables (not illustrated). In some embodiments, the sling can be inverted to discharge mass supported thereby, or the masses can be discharged therefrom using rollers, guides, or otherwise to manipulate the sling material. For example, a central array of wheels could be used to discharge the mass from the sling.

Additionally, in some embodiments, the energy storage device 300 or any other energy storage device disclosed herein can be configured such that the carriers can be removably supported by the cable 306, and/or such that the positioning of the carriers 303 on the cable 306 can be adjusted either before or during operation of the energy storage device 300 (for example, when the cable 306 is stable or when the cable 306 is moving). The energy storage device 300 or any other energy storage device disclosed herein can be configured such that the removal and/or positioning of the carriers 303 can be adjusted and controlled by an operator of the energy storage device 300 or automatically by a control system of the device. For example, the control system of the energy storage device 300 can have pre-programmed algorithms to control the operation of the device 300 depending on or to accommodate a variety of different operating conditions or energy grid conditions.

As with other embodiments herein, the cable system 306 can be routed over a plurality of smaller pulleys or guide wheels supported by one or more support towers or support members (not illustrated) positioned along the slope. If the energy storage device 300 is vertically oriented, support towers may be omitted. The first bullwheel 304a can be positioned at a lower elevation than the second bullwheel 304b. The second bullwheel 304b can be connected to the motor/power generator 308 such that, when the operator of the energy storage device 300 desires to store energy in the energy storage device 300, the motor 308 rotates the second bullwheel 304b in a first direction that causes the masses 302 to be pulled up the slope to increase the potential energy of the energy storage device 300. For some embodiments disclosed herein, using multiple masses can permit more mass to be used, increasing the amount of energy that can be stored in an energy storage device, while reducing the structural requirements of the energy storage device.

Furthermore, as mentioned, the masses 302 can be adjustable, changeable, or removable. For example, a first mass or pile 310a of mass medium 307 can be positioned at or near the bottom or lower portion of the energy storage device, and a second mass or pile 310b of mass medium 307 can be positioned at or near the top or upper portion of the energy storage device 300. The energy storage device 300 can be configured such that the mass contained or supported along the cable 306 can be partially or fully transferred from the first mass or pile 310a into the carriers 303 supported by the cable 306, pulled up to the higher elevation, and transferred into the second mass or pile 310b during the power storage mode or operation of the energy storage device 300.

In contrast, when the operator of the energy storage device 300 desires to produce energy to the grid, power to the motor 308 can be ceased and mass can be transferred from the upper mass or pile 310b onto the cable system 306 whereby gravity can cause the mass to descend down the slope or vertical descent toward the lower elevation and transferred to the first or lower mass or pile 310a, thereby generating power in the motor/generator 308. Such power can be transferred to the grid through a power electronics system or module. The mass medium 307 can be transferred to the carriers 303 in any of a variety of means.

For example, the mass medium 307 can be passed through one or more controllable discharge devices 320, which can be valves, releasable doors, or otherwise such as those on a hopper or other medium container, can be supported or positioned beneath the mass or pile 310a, 310b of medium 307. The one or more discharge devices 320 for each mass or pile 310a, 310b can be positioned such that the material flowing through the valve is not blocked by the cable. The discharge devices 320 can be controlled by one or more control systems 324 of the device 300 (not illustrated). When the discharge devices 320 are opened, the mass medium 307 can be dumped, poured, or otherwise transferred into the carriers 303. In this arrangement, the carriers 303 can be routed under the mass or pile 310b through a tunnel or otherwise by the cable system 306. In some embodiments, one or more movable valve mechanisms can be positioned under each pile.

Figure 11A:
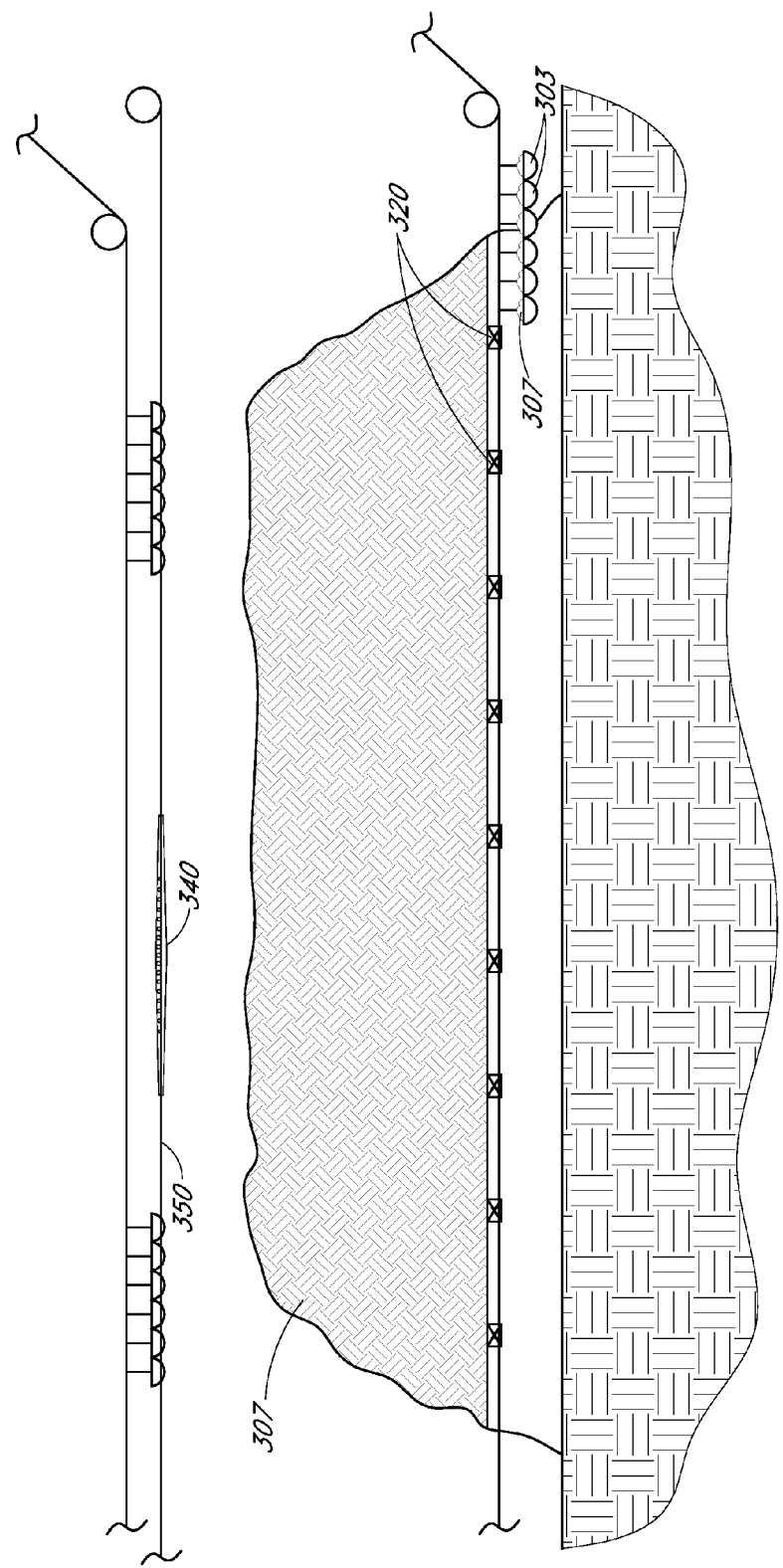
FIG. 11A is an enlarged view of a portion of the example embodiment of the energy storage device illustrated in FIG. 9.

Alternatively, one or more hopper systems can be used in addition to or in place of the valve systems and piles 310 to transfer the mass medium from the mass or piles 310a, 310b to the carriers. An embodiment of a hopper system 325 is illustrated in FIG. 11B. The hopper system 325 can be used in place of one or more of the piles 310 and valve systems discussed with reference to the other embodiments disclosed herein. The hopper 325 can be actuated to discharge the medium 307 in the carriers 303 as the carriers 303 pass beneath the output of the hopper 325. The controllable discharge device(s) 320, the hopper systems, and/or any other suitable mass transfer mechanism can be configured to provide an intermittent or pulsed flow of mass therethrough at any desired flow rate, or can be configured to provide a continuous flow of mass therethrough at any desired flow rate.

Additionally, in some embodiments, one or more sensors can be integrated into any examples of the energy storage devices disclosed herein. For example, sensors can be used to determine the position and/or volume of the mass medium at the various locations in the energy storage devices (including the site piles), the volume of mass medium in the carriers, the position of the carriers for locating the tipping mechanism, the position of the carriers for dispensing the mass medium into the carriers, the position of the one or more dispensing mechanisms (for example, if such dispensing mechanisms are movable), or for any other purpose. The sensors can be configured to provide feedback positional, volumetric, or other gathered data back to the energy storage device operator, the control system, or otherwise.

In this operational scenario wherein power is desired to be produced to the grid, when the masses 302 along one side of the cable system 306 reach the lower, first mass or pile 310a, the mass medium 307 in each carrier 303 can be transferred onto the first mass or pile 310a. In some embodiments, the carriers 303 on one side of the cable system 306 can be routed over the first, lower mass or pile 310a so that the mass medium 307 in each of the carriers 303 can be dumped, poured, or otherwise transferred onto the top of the mass or pile 310a. In some embodiments, the carriers 303 can be configured to be tipped by a tipping mechanism at desired positions relative to the mass or pile 310. For example, without limitation, a controllable tipping mechanism controlled by the control system 324 may be movably positioned at any desired position relative to the first, lower mass or pile 310a. The tipping mechanism may be supported by a separate cable system that allows the tipping mechanism to travel therealong.

Therefore, the energy storage device 300 can be configured to transfer mass from the carriers 303 supported by the cable system 306 to the mass or piles 310a, 310b or vice versa, by tipping or dumping the contents of the moveable containers in any direction onto the mass or piles 310a, 310b, releasing material through valves or releasable doors in the carriers 303, or through any suitable means. Similarly, the energy storage device 300 can be configured to transfer the mass from the mass or piles 310a, 310b to the carriers by pouring material from the mass or piles 310a, 310b into the moveable carriers by releasing material through valves or releasable doors beneath the mass or piles 310a, 310b into the moveable carriers, by scooping and transferring the material from the mass or piles 310a, 310b into the carriers 303, or through any other suitable means.

Figure 12A:
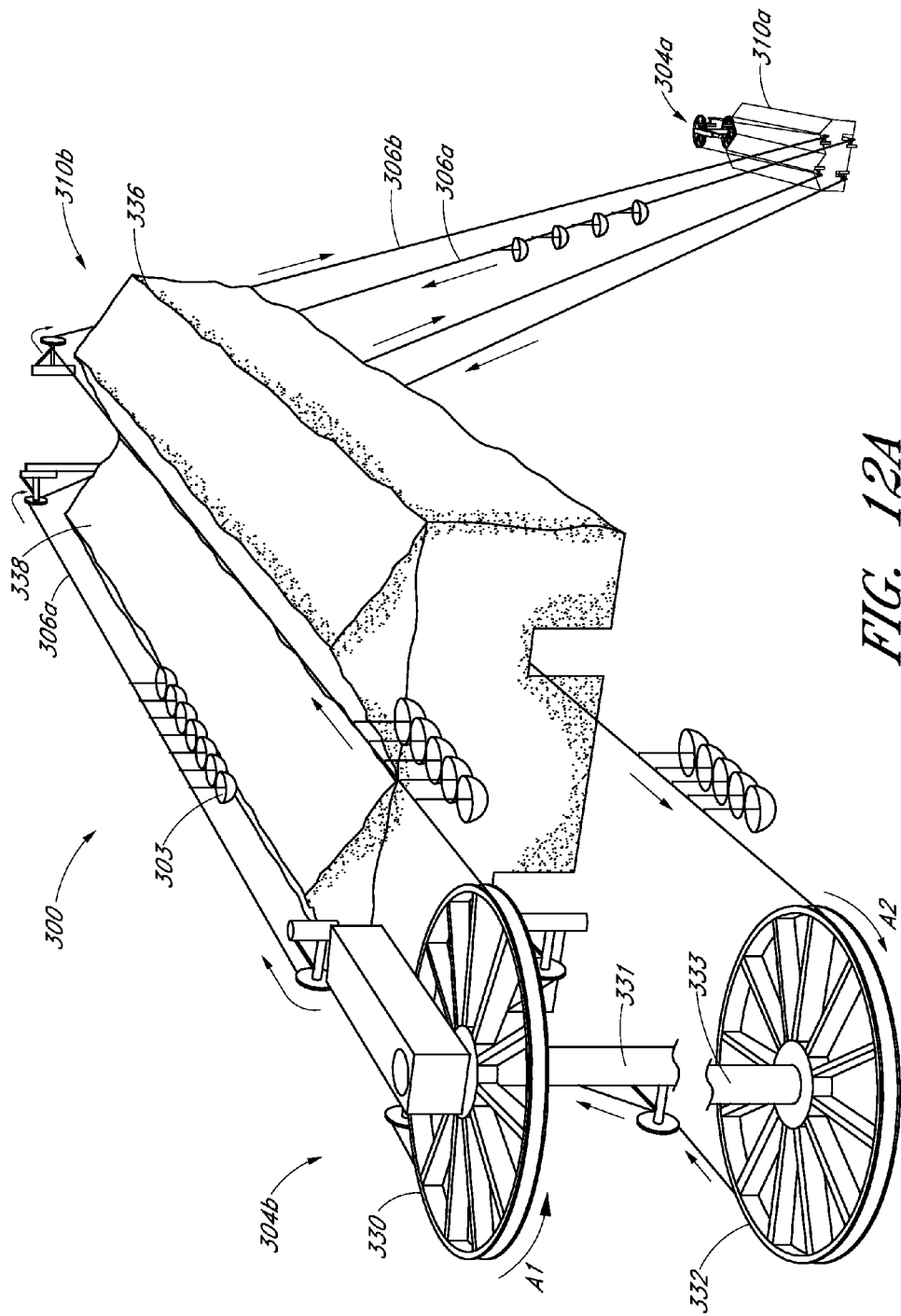
FIG. 12A is a perspective view of the example embodiment of the energy storage device illustrated in FIG. 9, taken from an upper view, showing the path of movement of a first loop of the cable system.
Figure 12B:
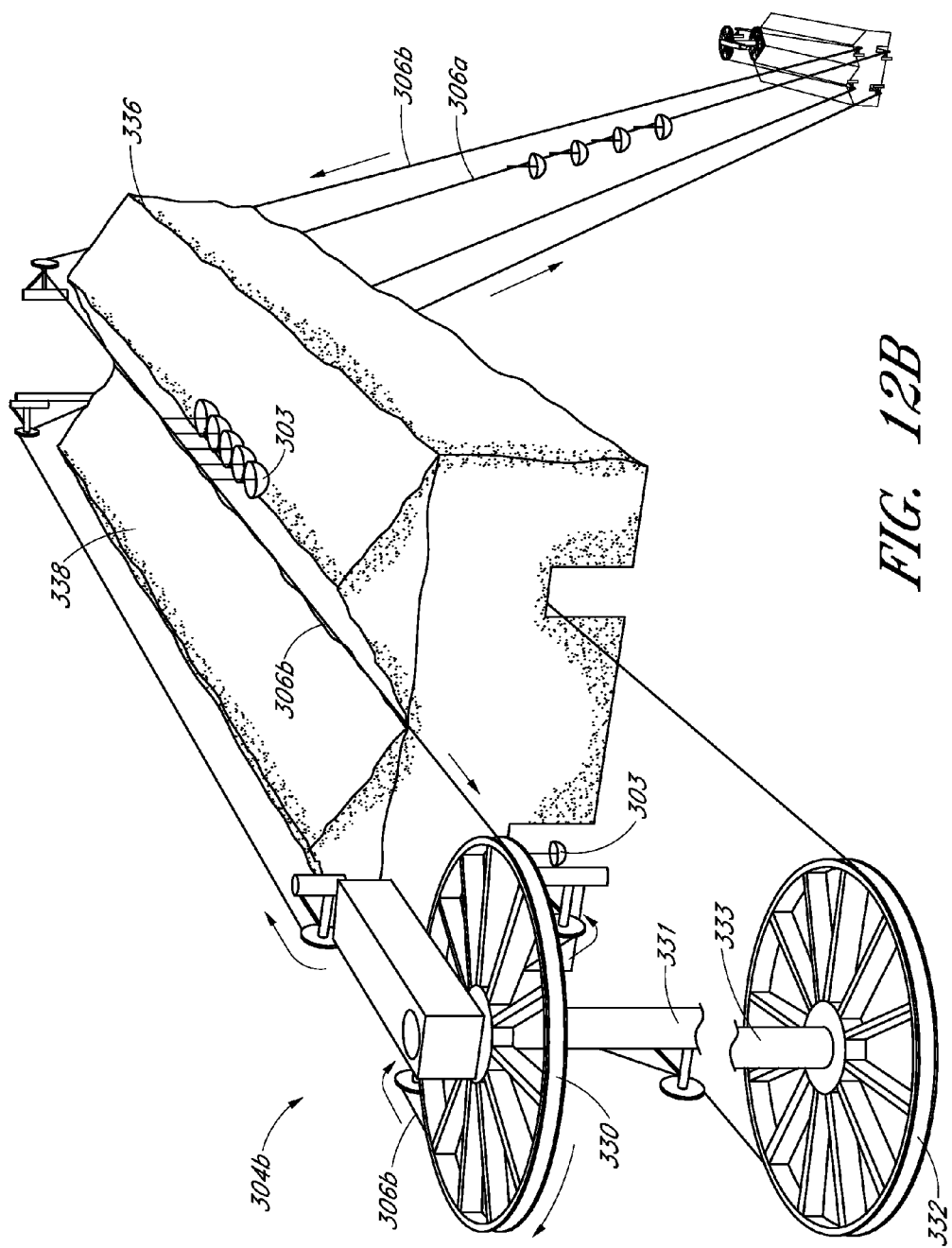
FIG. 12B is a perspective view of the example embodiment of the energy storage device illustrated in FIG. 9, taken from an upper view, showing the path of movement of a second loop of the cable system.
Figure 14:
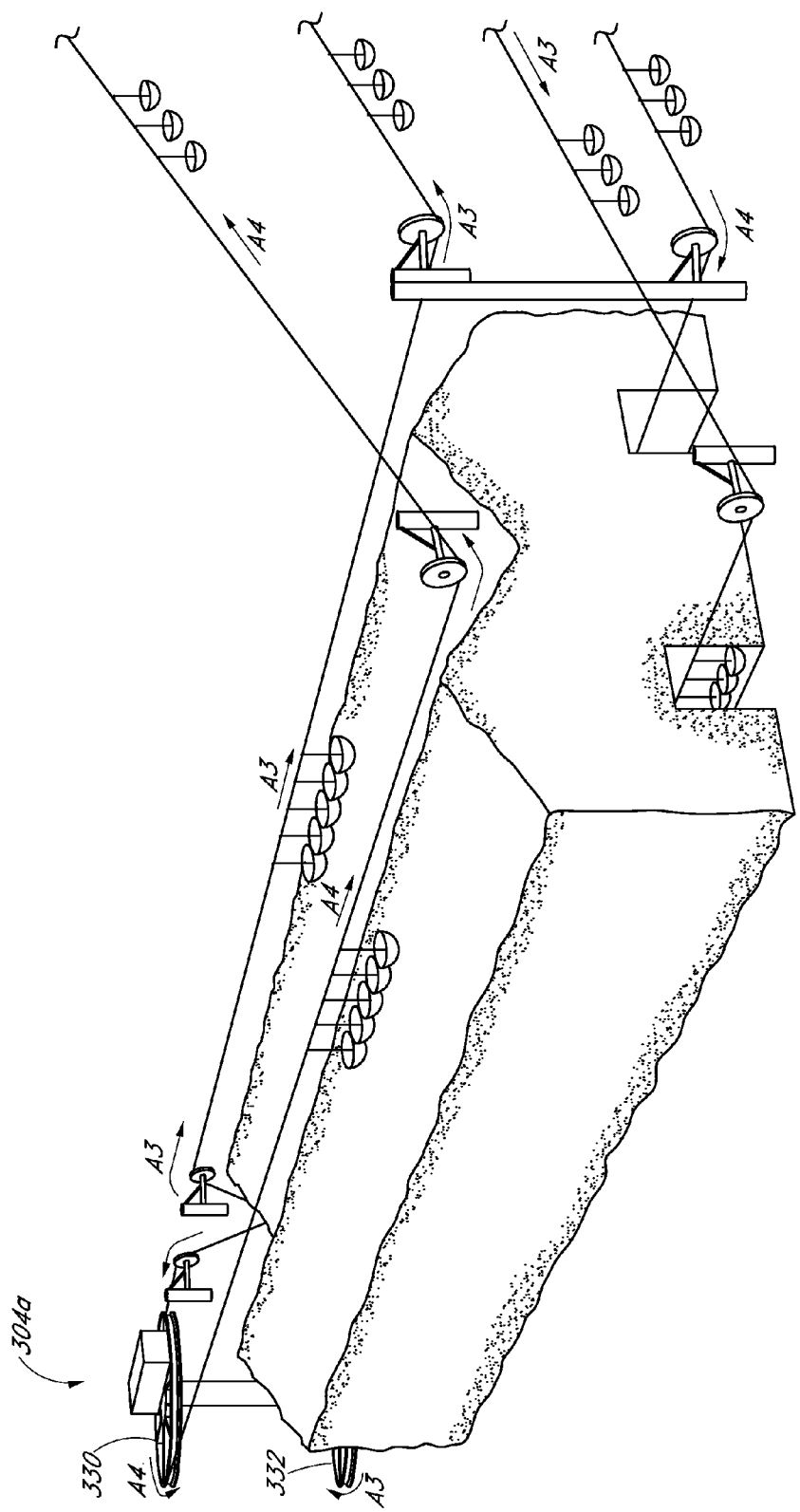
FIG. 14 is a perspective view of the example embodiment of the energy storage device illustrated in FIG. 9, taken from a lower view, showing the path of movement of a first loop and a second loop of the cable system.

FIG. 12A is a perspective view of the embodiment of the energy storage device 300 illustrated in FIG. 9, taken from an upper view, showing the path of movement of a first loop of the cable system 306. FIG. 12B is a perspective view of the embodiment of the energy storage device 300 illustrated in FIG. 9, taken from an upper view, showing the path of movement of a second loop 306b of the cable system 306. FIG. 13 is a perspective view of the embodiment of the energy storage device 300 illustrated in FIGS. 12A and 12B, taken from an upper view. FIG. 14 is a perspective view of the embodiment of the energy storage device 300 illustrated in FIG. 9, taken from a lower view, showing the path of movement of a first and second loops of the cable system 306. With reference to FIGS. 9-13, the upper bullwheel system 304b can be configured and supported in a manner and using structural supports and framework necessary for the cumulative mass or load to be carried by the cable system 306. For example, in some embodiments, the bullwheel systems 304a, 304b or any other components of the energy storage device 300, including the pulleys, towers, cable system, or other related components, can be made and installed in a manner that is similar to that of a ski lift, gondola, tram system, or other moveable cable suspension system. Such details are well known to those of ordinary skill in the art. The first or lower bullwheel 304a can be similarly configured as compared to the second bullwheel 304b.

As illustrated in FIG. 12A, the second or upper bullwheel system 304b can have a first wheel 330, a second wheel 332, and/or other wheels that can be connected to other motor generators along the line. For example, a third set of bull wheels can be positioned at the mid point of the elevation difference between the upper and lower elevations. In some embodiments, though not required, the second wheel 332 can be offset or eccentric as compared to the first wheel 330, which can minimize or prevent interference between carriers 303 on the first cable loop system 306a and the second cable loop system 306b. The first wheel 330 and the second wheel 332 can be driven by the same shaft or by separate shafts, as illustrated. Additionally, the first wheel 330 and the second wheel 332 can be driven by different motor generators. Further, some energy storage device embodiments can have a one or more motor generators positioned at the top elevation for each of the wheels or for both of the wheels, one or more motor generator positioned at the lower elevation for each of the wheels or for both of the wheels, and/or one or more motor generator positioned along the length of the cable at a third elevation for generating energy or providing energy for storage.

In some embodiments, the adjacent wheels (such as, without limitation, wheels 330, 332) can be supported on separate axles that are independently controllable such that the wheels (e.g., wheels 330, 332) counter-rotate relative to one another. Thus, in some embodiments, the wheels can be independently controlled to rotate in opposite directions or in the same direction relative to one another. For example, with reference to FIG. 12A, the first wheel 330 can be supported by a first shaft 331 and can be configured to rotate in a first direction A1, while the second wheel 332 can be supported by a second shaft 333 and can be rotated in a second direction A2 that is opposite the first direction.

Some embodiments of the energy storage device can be configured such that the carriers 303 that are moved to the second, higher elevation always travel under the mass piles or portions 336, 338 before traveling over the mass piles or portions 336, 338. This control measure can ensure that the carriers 303 are not intermittently emptied or filled and can ensure that the carriers on one side of each cable are consistently loaded with mass. In this arrangement, switching between energy storage and energy production can be achieved by reversing the direction of rotation of the wheels and the cable system. Any of the structural or operational configurations described herein with respect to one portion of an energy storage device embodiment can be applied to other portions of the energy storage device embodiments. For example, in some embodiments, the configuration and/or operation of the portion of the energy storage device at the lower elevation can be the same as the configuration and/or operation of the portion of the energy storage device at the higher elevation.

In some embodiments, a system of pulleys and guides can be used to minimize or prevent interference between carriers 303 on the first cable loop system 306a and the second cable loop system 306b. In this arrangement, the first and second wheels 330, 332 can be approximately concentrically aligned.

With reference to FIG. 12A, with reference to the direction arrows listed therein, if the buckets or carriers 303 were operationally discharging mass on mass pile or portion 338, the system would be considered to be in a charging or energy storage state. However, if the buckets or carriers 303, moving in the same direction as illustrated in FIG. 12A were receiving mass from mass pile 336, the system would be considered to be in a discharging or energy generating state.

Additionally, in some embodiments, the first and second wheels 330, 332 can have a different size to minimize or prevent interference between carriers 303 on the first cable loop system 306a and the second cable loop system 306b. For example, the first or lower bullwheel system 310a can have a first wheel 330 that has a first diameter and a second wheel 332 that has a second diameter, the diameter of the first wheel 330 being bigger than a diameter of the second wheel 332. Similarly, the second or upper bullwheel system 310b can have a first wheel 330 that has a first diameter and a second wheel 332 that has a second diameter, a diameter of the first wheel 330 of the second bullwheel system 310b being bigger than a diameter of the second wheel 332 thereof. A first cable loop 306a can be connected to the first wheel 330 of the first bullwheel system 310a and the second wheel 332 of the second bullwheel system 310b. A second cable loop 306b can be connected to the second wheel 332 of the first bullwheel system 310a and the first wheel 330 of the second bullwheel system 310b. Each of the first and second bullwheel systems 310a, 310b can have motor/power generator 308 so that the torque and power produced or generated by each of the first and second bullwheel systems 310a, 310b can be moderated and independently controlled.

FIG. 12A shows the path of movement of carriers 303 moving along a first, changeable direction of the first cable system 306a. Only some of the carriers 303 that can be supported by the first cable system 306a are shown, for clarity. As illustrated by the motion arrows in FIG. 12A, carriers 303 supported by the first cable system 306a can travel up the incline, under the first pile or mass 336, around the second wheel 332 and be directed to move over the second pile or mass 338 by rollers, guides, or otherwise. In this arrangement, the carriers 303 can be filled by the first pile 336 and/or the carriers 303 can dump or otherwise transfer the mass 307 to the top of the second pile 338. In a typical operational arrangement, the carriers 307 moving along one cable loop would only either receive or discharge mass at one elevational position, since both receiving and discharging mass at the upper elevational position, for example, could result in a zero net gain or loss of mass at such elevation and would not result in the generation or storage of energy.

FIG. 12B is a perspective view of the embodiment of the energy storage device 300 illustrated in FIG. 9, taken from an upper view, showing the path of movement of a second loop 306b of the cable system 306. For illustration purposes, the upper bullwheel system 304b is rotating in the same direction as in FIG. 12A. Again, only some of the carriers 303 that can be supported by the second cable system 306b are shown, for clarity. As illustrated by the motion arrows in FIG. 12B, carriers 303 supported by the second cable system 306b can travel up the incline, over the first pile or mass 336, around the first wheel 330 and be directed to move under the second pile or mass 338 by rollers, guides, or otherwise. In this arrangement, the carriers 303 can discharge the mass 307 onto the first pile 336 and/or the carriers 303 can be filled with the mass 307 by the second pile 338.

Figure 15:
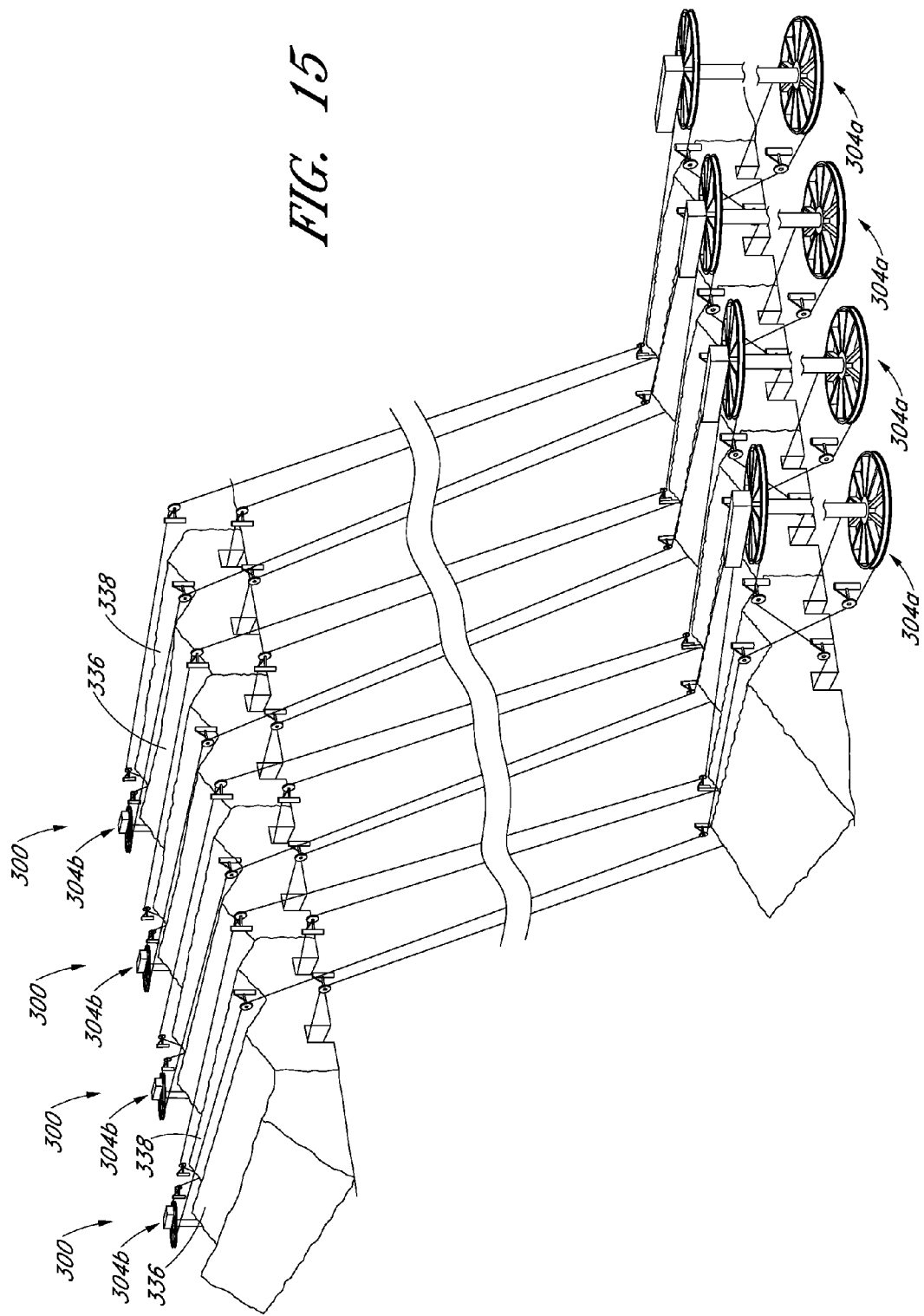
FIG. 15 is a perspective view of a plurality of example energy storage devices arranged about a hillside.

FIG. 15 is a perspective view of a plurality of energy storage devices 300 arranged about a hillside. With reference to FIGS. 9-15, the mass medium piles 336 and 338 can be positioned adjacent to one another so as to be laterally supported by one another. In other words, the first mass pile 336 can be supported laterally on one side by the second mass pile 338. A dirt berm such as is positioned adjacent to the first mass pile 336 near the upper bullwheel 304b in FIG. 15, a wall, or other support structure can be positioned along any portion or all of the perimeter or on the outside of the outermost mass pile or any mass pile for support, or the outermost mass pile can be allowed to spread laterally, as shown in the lower portion of the energy storage device 300 in FIG. 15. Any number of mass piles and cable systems can be used in a single energy storage device facility, depending on such factors as the amount of energy desired to be stored, the size of each mass pile or mass system of each cable system, the structural support requirements of each cable system, and the number of different cable systems 306 that are desired to be built in the facility. Further, additional cable systems 306 can be added to the system as desired.

With reference to FIG. 13, with the upper bullwheel 304b rotating in a first direction A3, the movement of the first cable system 306a will move in the direction indicated by arrows A3. Further, with the lower bullwheel 304a rotating in a second direction A4 that is opposite direction A3, the movement of the second cable system 306b will move in the direction indicated by arrows A4. With reference to FIG. 14, which is a perspective view of the embodiment of the energy storage device 300 illustrated in FIG. 9 taken from a lower view, with the lower bullwheel 332 rotating in the direction A3 and the upper bullwheel 330 rotating in the direction A4, the movement of the first and second cable systems 306a, 306b will travel in the directions indicated by the arrows shown on FIG. 13.

As mentioned, in some embodiments, the second wheel 332 can be offset or eccentrically supported as compared to the first wheel 330, which can minimize or prevent carriers 303 supported on the first cable loop system 306a from interfering with carriers 303 supported on the second cable loop system 306b. For example, pulleys 311a, 311b can be used to guide and/or support the first cable 306a. Pulleys 311c, 311d can be used to guide and/or support the second cable 306b. In some embodiments, as in the illustrated embodiment, the second bullwheel 332 can be positioned so as to be offset in an x-direction as compared to the first bullwheel 330. Similarly, both of the pulleys 311c, 311d supporting second cable 306b can be positioned so as to be offset in an x-direction as compared to the pulleys 311a, 311b supporting cable 306a. In some embodiments, if the offset is at least slightly greater than a width of the carriers 303, then there will not be interference between the carriers 303 on the first and second cables 306a, 306b. A similar arrangement can be used for the lower elevation.

Figure 16:
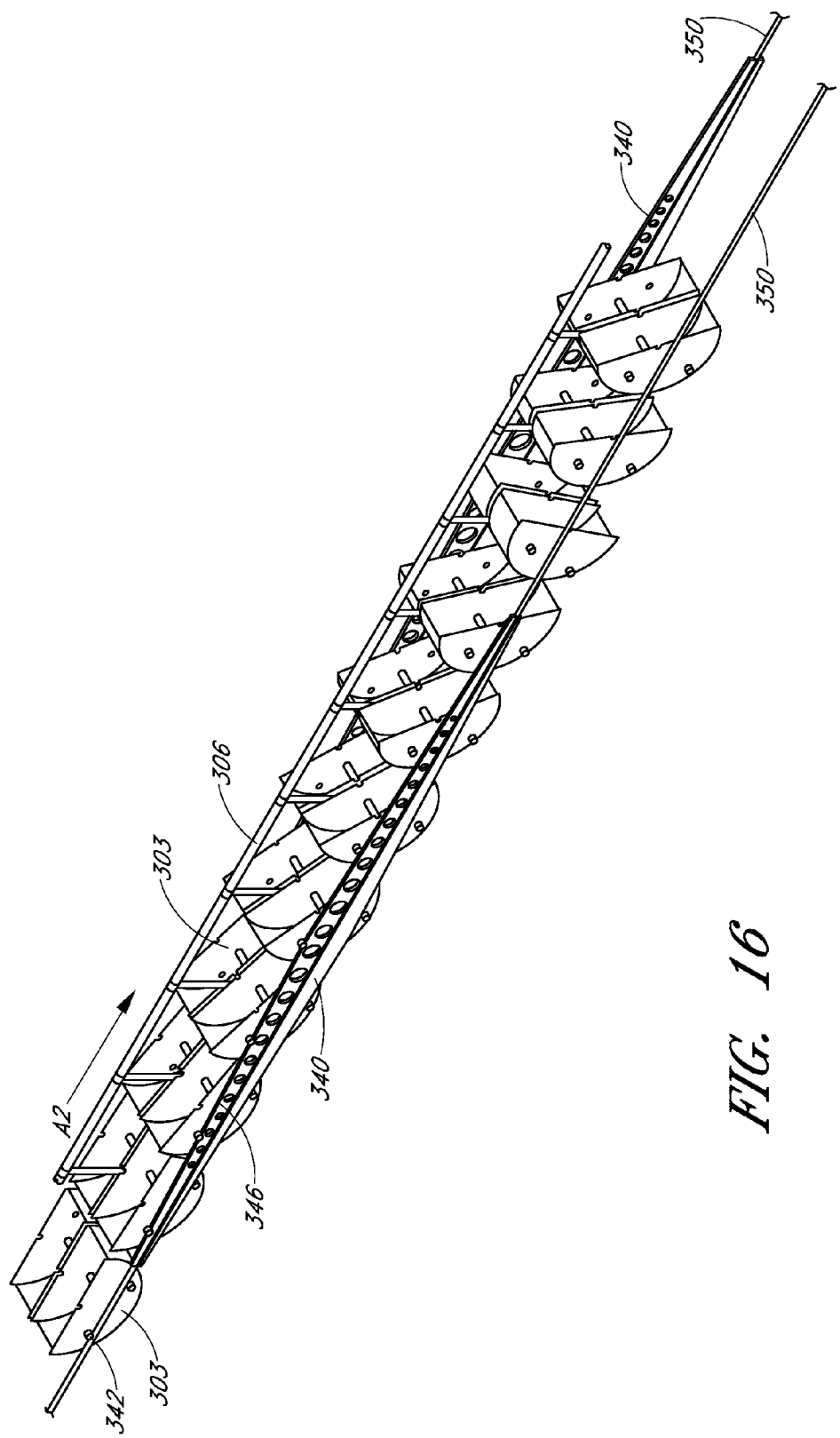
FIG. 16 is a perspective view of an example trigger or tipping mechanism that can be used to activate the discharge of the medium carried by the carriers.

FIG. 16 is a perspective view of a tipping trigger or member 340 that can be used to activate the discharge of the medium 307 carried by the carriers 303. In some embodiments, the tipping member 340 can interact with a lever, pin, or other similar object 342 positioned on an outside surface of one or more of the carriers 303. For example, the tipping member 340 can have an angled surface 346 that can engage the lever 342 of one or more of the carriers 303, causing the carrier 303 to rotate about an axis (concentric to an axle, for example) as the carrier 303 is moved relative to the tipping member 340, as in the direction represented by arrow A2. The tipping trigger or member 340 can be movable relative to the carriers 303. For example, in some embodiments, the tipping member 340 can be supported by one or more cables 350 such that either the cable or cables are moveable or the tipping member 340 is movable along the cable 350.

In some embodiments, the dumping mechanism can have a spreader mechanism to put more gravel in a shorter pile. The spreader mechanism can be configured to use the potential energy of the gravel pile. The spreader mechanism can be similar to or comprise a fertilizer spreader, a fixed conical ramp, and/or a rotating conical spreader ramp.

The carriers 303 can be biased and configured such that, as the carriers 303 move away from the tipping member 340 after the medium 307 carried by the carriers 303 has been dumped, the carriers 303 rotate back to a first or carrying position or orientation wherein they can be loaded with medium. In some embodiments, the carriers 303 can be spring loaded, eccentrically supported, or otherwise configured to resist rotation so that the carriers 303 remain in the first or carrying position when being loaded with medium 307, to prevent inadvertent tipping and discharge of medium 307.

Note that the cable 306 need not move for the tipping function to be activated. In some embodiments, the tipping member 340 can be moved relative to stationary carriers 303 to cause the carriers 303 to tip and discharge the mass medium 307 if desired. However, the tipping member 340 can be held in a fixed position or moveable above the piles 310 so that the carriers 303 can be discharged at any desired position along the piles 310 to maintain a consistent level of medium across the piles 310.

Figure 17:
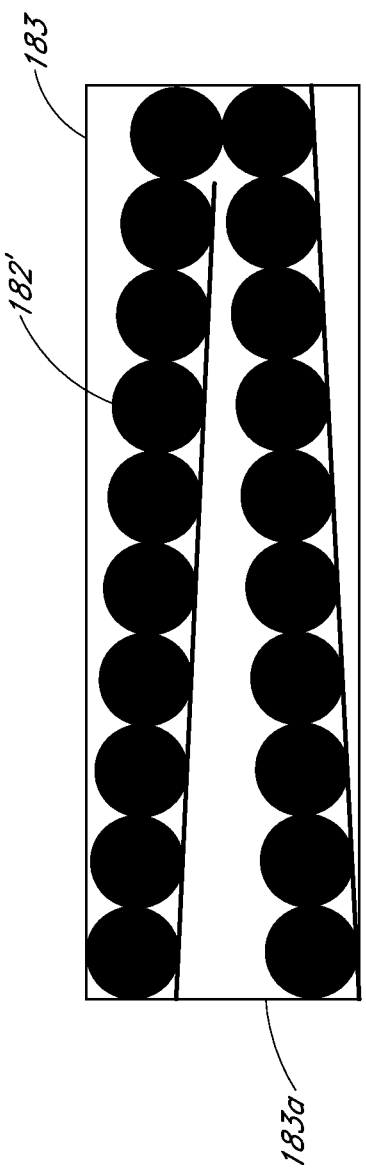
FIG. 17 is a side view of an example container for a plurality of masses having at least one round surface.

Any of the energy storage device embodiments disclosed herein can be configured to support a preformed weight mass, such as the masses 182' illustrated in FIG. 17. For example, without limitation, each energy storage device 180 embodiment illustrated in FIG. 6 can be configured such that one or more preformed masses can be added or removed from the cable 186. In some embodiments, the masses 182' can be round and rollable to facilitate handling (e.g., automatic loading and unloading) and storage of the masses 182'. The masses 182' can be configured to roll on racks or rails, such as may be formed on the inside of a standard shipping container. The container 183 can be configured such that the masses 182' can be added to the top of the container 183 as energy is stored (for example, at the top of the elevation or slope) or as energy is generated (for example, at the bottom of the elevation or slope). The container can be configured such that the masses 182' roll down the ramping inside the container to a discharge opening 183a to be removed and added to the cable system 186.

The elevation change or slope for the energy storage can be provided by situating the storage facility wherever there is sufficient elevation change. Because any of the energy storage devices embodiments disclosed herein can be scaled or sized according to the target location or site, the number of suitable and conveniently located sites appropriate for energy storage devices is maximized. For example, natural hillsides, slopes, cliffs, mountains, abandoned or even operational open-pit mines and rock quarries can be suitable locations for some embodiments of the energy storage devices disclosed herein.

The power that can be generated by some embodiments disclosed herein can be calculated approximately with reference to the equation P=F*V, where P is power, F is force, and V is velocity. In most power generation systems, such as an internal combustion engine, both F and V are varied. In some energy storage device embodiments disclosed herein, such as embodiments where the masses are not removable or adjustable, F (force) can be held constant and V can be varied. However, some energy storage device embodiments disclosed herein allow for adding and removing mass from the system or by varying the distance between masses, thereby resulting in varying F.

When power is being generated at a specific level and the signal is received from the grid to generate a different amount of power, the speed of the lift can be changed in substantially real-time to change to the new power production setting, due to the correlation between power and velocity (optionally without halting the supply or storage of energy). For example, if the lift were generating power by lowering the weights, and then more power was needed to be generated, the speed of the line would need to be increased. In order to increase the speed of the line, the line needs to accelerate. The resistance to motion of the cable or line is caused by the motor/power generator. In other words, what had been holding the cable or line at steady state or resisting the motion of the cable was the drag imposed on the cable by the motor/generator that was converting the motion into usable energy and electricity. In order to accelerate the line, without changing the mass on the line, the power being produced must be temporarily lowered or ceased, thereby reducing the drag on the line and allowing gravity to accelerate the masses up to the new desired speed, and then power must be drawn again or increased. In sum, in some embodiments, if the desired power output is to be increased, the power output must be temporarily decreased or ceased until the new line speed is reached, and then the increased power can be drawn, reverting the line to a new desired velocity or a steady state velocity.

The opposite phenomena can occur when the power being produced is desired to be decreased. In this case, the speed of the line can be reduced to a new desired set point. To reduce the speed of the line, the power drawn from the line can be temporarily increased, in order to slow the line down. Alternately, a brake can be applied to slow the line down, although this reduces round-trip efficiency. In this case, if a decreased power is desired, the level of power generation can be temporarily increased until the new, slower line speed is reached, and then the decreased power can be drawn.

Additionally, the velocity of the line and power generated can be adjusted by adjusting the mass supported by the line. For example, if it is desired to increase the power generated by the line or the velocity of the line, the amount of mass added to the line can be increased. Alternatively, if it is desired to decrease the power generated by the line or the velocity of the line, the amount of mass added to the line can be decreased.

The system can be tailored to meet different energy storage markets—from the rapid fluctuations required to balance transient instabilities in the grid by supplying frequency regulation ancillary services, to bulk storage applications requiring the storage of large amounts of electricity. This is accomplished by changing the amount of weight stored in the storage containers, and the amount of weight stored at any one time upon the haul rope, depending on the specific installation's needs.

A system which consists of a set of masses, connected to a generator via a linkage, descending from one elevation to a lower elevation, moving at a constant velocity, will generate power according to the following formula:

$$\begin{aligned} \text{Power} &= \text{Force} * \text{Velocity} \\ &= \text{mass} * g * \text{vertical component of velocity} \\ &= m * g * v * \sin\theta \text{(where } \theta \text{ is measured from the horizontal)} \end{aligned}$$

Holding mass constant, knowing that g and θ are fixed, one way to change the power is to adjust v. If more power is desired from the system, v needs to increase. If less power is desired, v needs to decrease.

The means used to control the speed of the descending masses, wherein the mass supported by the system is held constant, is through control of the power drawn from the system. In order to increase the speed of the masses, with mass being constant, the power drawn from the system can be reduced for a period of time, allowing the masses to accelerate to the desired higher speed. Likewise, in order to decrease the speed of the masses, the power drawn from the system can be increased for a period of time, decelerating the masses. This presents a non-intuitive design. If greater power is required, the power draw from the system can be temporarily decreased. If less power is required, the power draw from the system can be temporarily increased. However, in some embodiments, where the mass supported by the system can be adjusted, adjusting the power drawn from the system or stored by the system can be achieved by changing the mass supported by the system.

In any of the energy storage devices ("ESD") embodiments disclosed herein, for example ESD 300, the magnitude of energy storage and energy generation can be adjusted in a number of different ways during the operation of the ESD. For example, in some arrangements, the magnitude of the energy stored and the energy generated can be adjusted by increasing or reducing the aggregate amount of mass that is being moved by the system from one elevation to a second, different elevation. If, for example, the carriers along one side of the cable system going from a lower to a higher elevation are consistently filled to 80% of their individual capacities, increasing the mass of each carrier to 100% can increase the magnitude or rate of energy storage. Further, increasing the speed of the cable system can also increase the magnitude or rate of energy storage. If the masses supported by the cable system are removable, increasing the mass supported along one side of the cable system by decreasing the spacing between masses or increasing the magnitude of at least one of the masses supported along one side of the cable system can increase the magnitude or rate of energy storage or energy reduction. Increasing the cable velocity in this arrangement can also increase the magnitude or rate of energy storage or energy reduction. Increasing velocity during energy generation without adjusting the amount of mass supported by the cable system, as discussed in greater detail elsewhere herein, can be done by momentarily reducing the drag force on the cable system by the motor generator to allow the cable to accelerate. Any combination of the foregoing operational methods can also be used to adjust the rate of energy storage or energy production.

Further, some embodiments can be switched from an energy production mode to an energy storage mode (or vice versa) by changing the direction of movement of the cable. Additionally, some embodiments can be switched from an energy production mode to an energy storage mode (or vice versa) by permitting the masses to be run around the bullwheels and to move in the opposite direction on a particular cable system.

Figure 18:
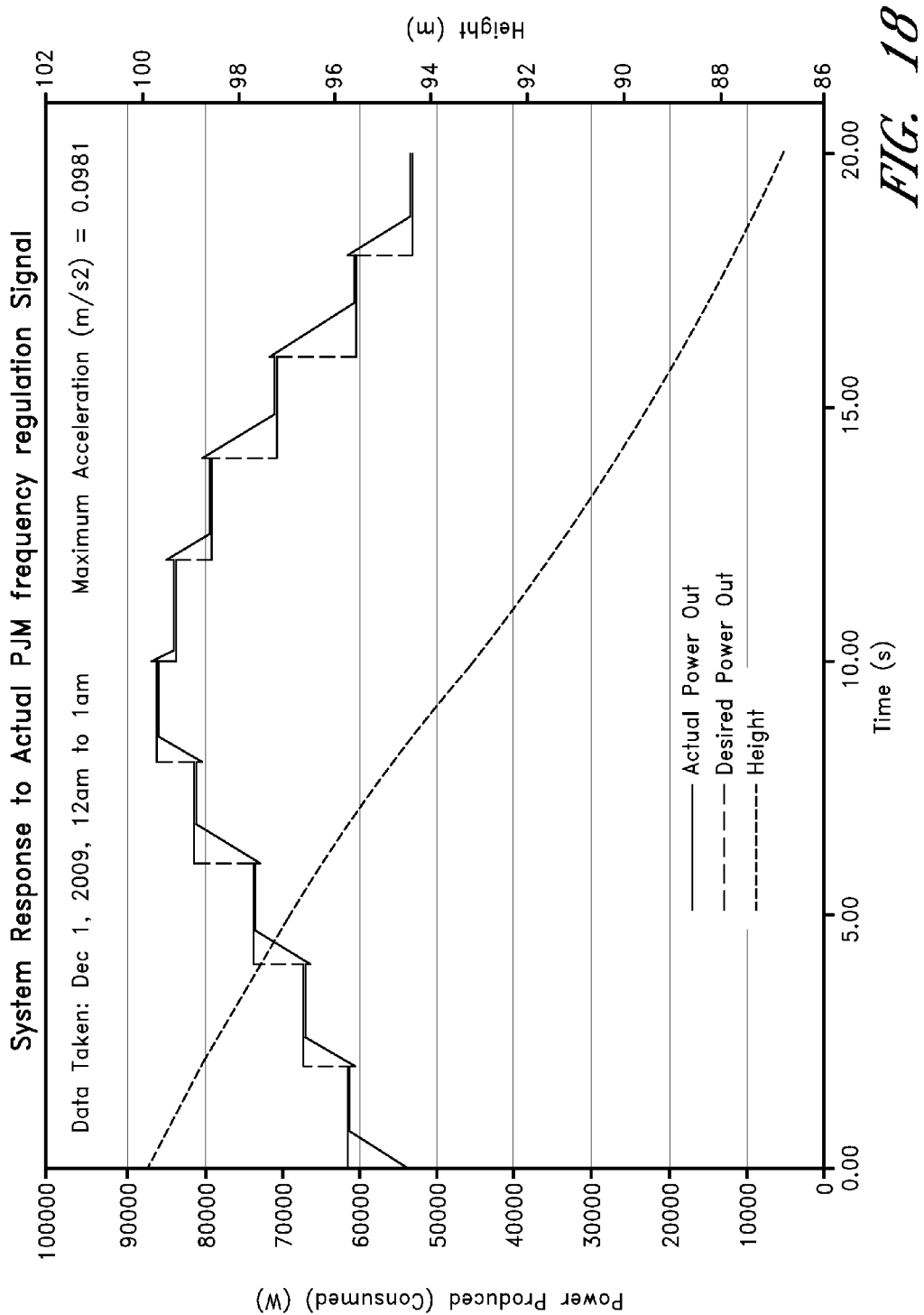
FIG. 18 is an example plot showing a first response to actual frequency regulation data from a grid operator.
Figure 19:
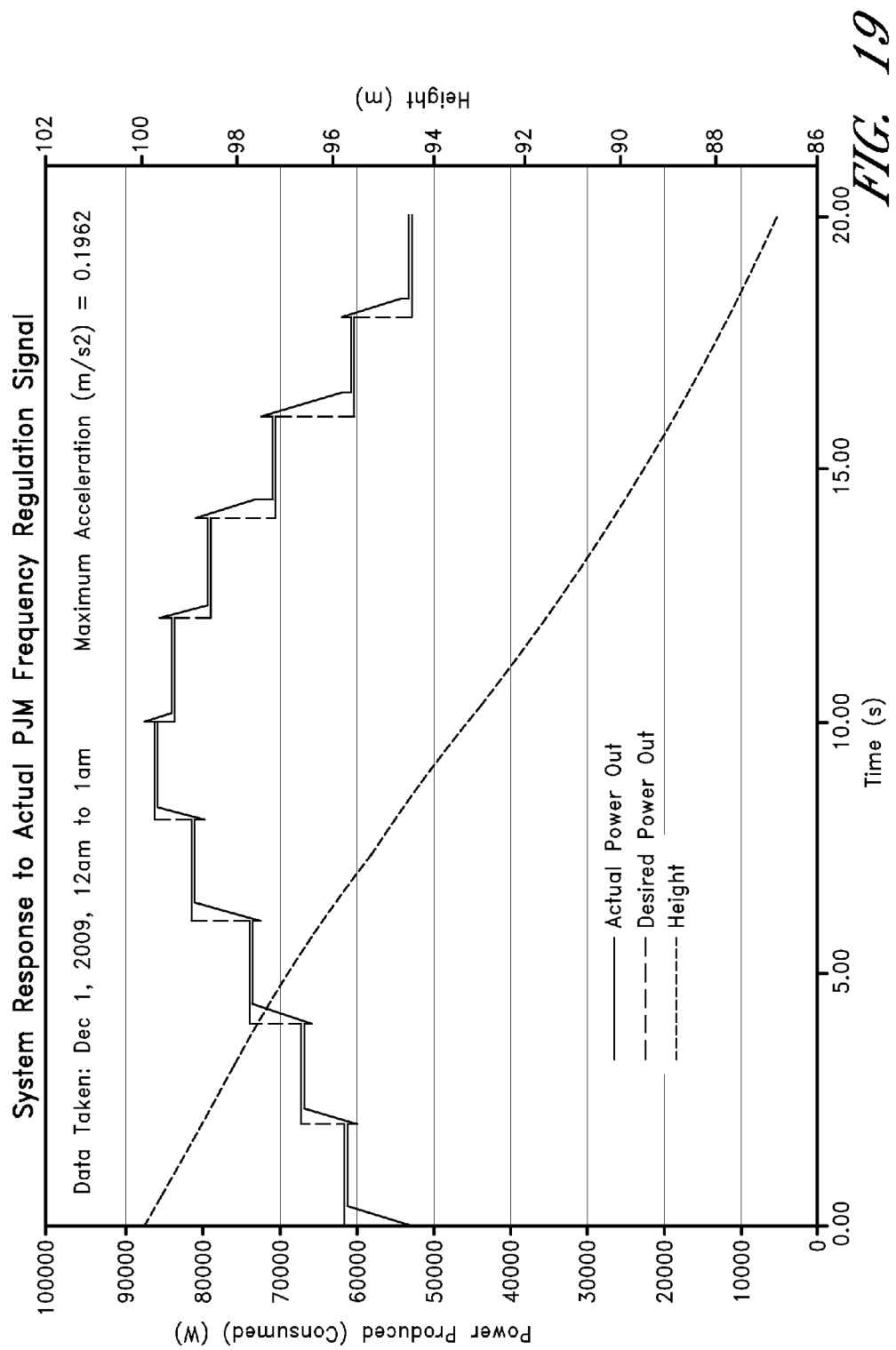
FIG. 19 is an example plot showing a second response to actual frequency regulation data from a grid operator.
Figure 20:
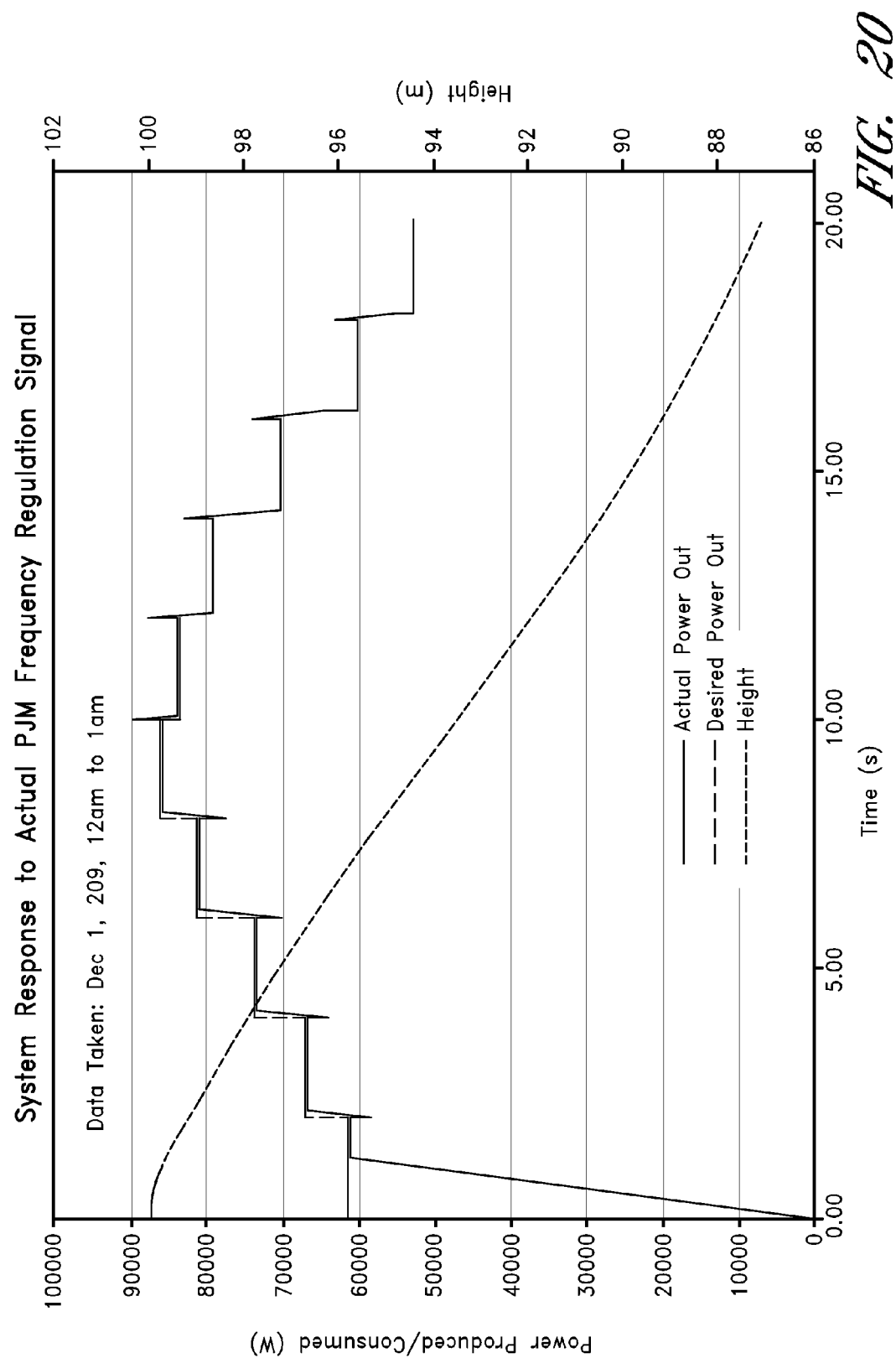
FIG. 20 is an example plot showing a third response to actual frequency regulation data from a grid operator.

Shown in FIGS. 18-20 are three responses to actual frequency regulation data from the grid operator PJM (serving Pennsylvania, New Jersey, Maryland and others). By adjusting the maximum acceleration of the masses, the reaction time to adjust the velocity can be reduced. The maximum acceleration can be adjusted by adjusting the power that is drawn from the motor/generator. If the motor/generator were completely removed from the line, then in the example embodiments the maximum acceleration would be based on the force of gravity (9.8 meters/second^2), or gravity×sin(A), where A is the angle of the hill. The motor controller can control the torque of the motor on the line, so this can be adjusted in real time. However, in doing so, the peak power increase or decrease, preceding the adjustment is either increased or decreased. Through this "reversal-method" of control, by temporarily increasing power when an overall decrease is required, or temporarily decreasing power when an overall increase is required, the system can be made to respond rapidly to large power surges required to provide frequency regulation for the electric grid. The responsiveness of the system to changes in power requirements can also be affected by the time required to make adjustments to the system, for example, the time required to temporarily decrease the power output of the motor/generator or the time required to adjust the mass on the system.

In some embodiments, when providing frequency regulation, the control system can receive the requested power level from the grid operator and determine the optimal adjustments for the device to meet the requested power. One embodiment of this implementation can use a software controller to implement the phenomenon described above for controlling a single mass lift. The following steps can be followed. First, receive requested power from the grid operator (Preq). Second, calculate desired mass velocity (Vdes), in accordance with the following equation, where M=mass on line, g=gravitational constant, and θ=slope of line.

$$Vdes = \left[ \frac{Preq}{M \cdot g \cdot \sin\theta} \right]$$

Third, calculate the difference in velocity from the desired point, where Vact=current speed of mass.

$$Verr = |Vact - Vdes|$$

Fourth, a new velocity can be calculated given the acceleration limit. For purposes of controlling the responsiveness of the system, it can be useful to set a maximum acceleration. This can prevent large load swings and power swings as the control system adjusts the system performance, where V2=new velocity point, Amax=maximum acceleration permitted, Δt=period of time between calculation iterations. Amax*Δt is positive or negative, such that V2 approaches or becomes equal to Vdes.

$$V2 = Vact \pm Amax \cdot \Delta t$$

Next, the new desired power setpoint can be calculated given new V2:

$$Pdes = \left[ \frac{M \cdot g \cdot V2 \cdot \sin\theta \cdot \Delta t + 1/2 \cdot M \cdot (V2^2 - Vact^2)}{\Delta t} \right]$$

Then, the power can be adjusted through the power electronics module to the desired power (Pdes). Finally, return to step 1, at time Δt later.

A second embodiment of the control system can be used when an array of lifts is used. Each lift can include a cable and pulley, as described in some embodiments disclosed herein. In this case, the overall power produced is a sum of the producing cables of an array of energy storage devices, each cable configured to raise or lower one or more weights to either store energy or generate energy, respectively. For example, if the full capacity of the system is 100 MW, and this is comprised of 10 lifts (or cable systems or loops), each with a capacity of 10 MW, then as the control system receives the requested power signal from the grid operator, the control system can activate different lifts to produce power. In this example, if 35 MW were required, this could be met with either 10 lifts operating at 3.5 MW, or with 3 lifts operating at 10 MW, one lift operating at 5 MW and the remaining 6 lifts idle. In fact, there may be situations when it might be advantageous to operate with some lifts running the opposite direction, such as, in the example provided, 6 lifts at 10 MW, one lift at 5 MW, 3 lifts charging at 10 MW, and one lift idle. These are some of the different control options available with a multi-lift array embodiment.

Figure 21:
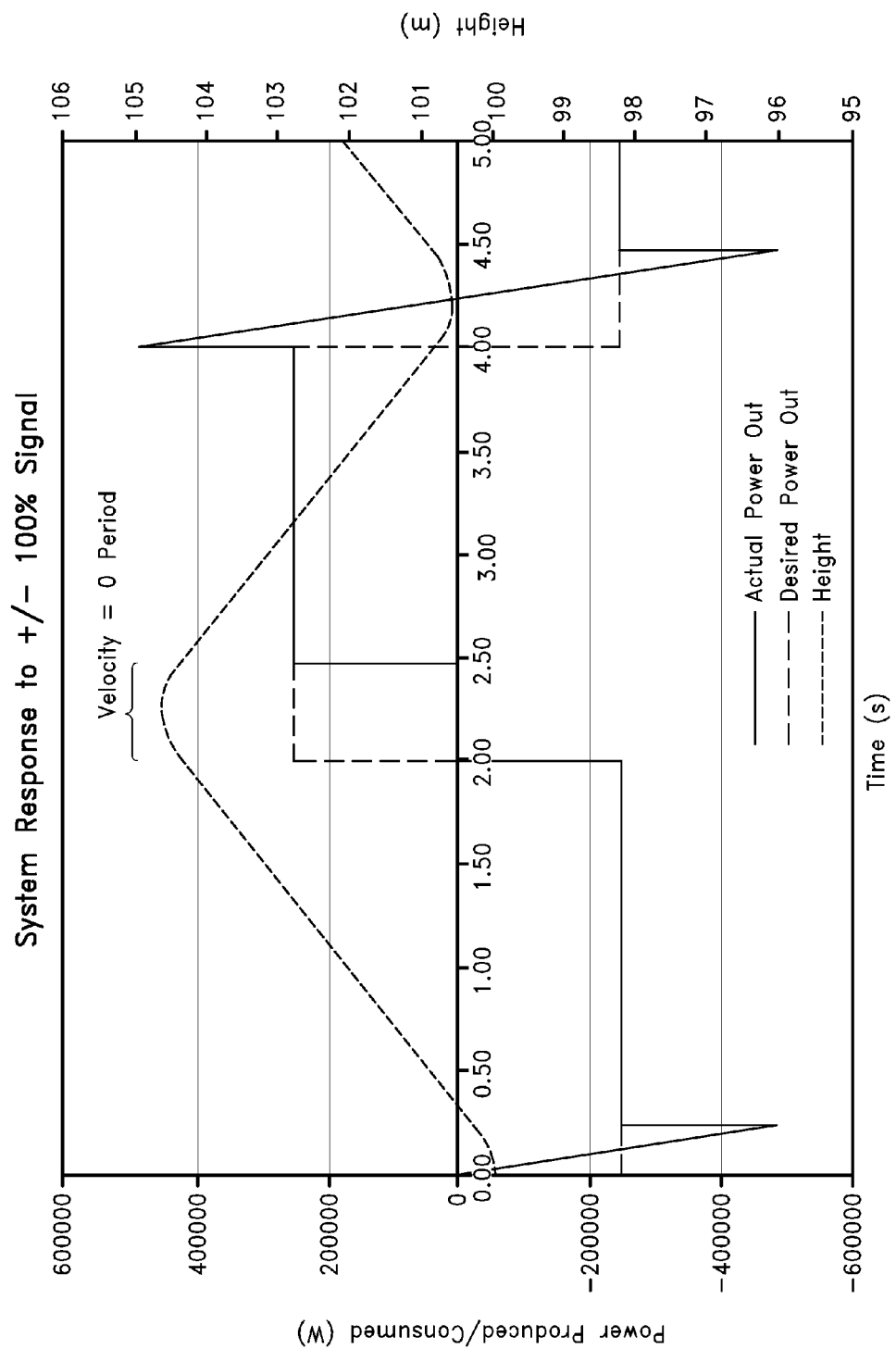
FIG. 21 is an example graphical representation of a simulation of actual power output, desired power output, and height.

FIG. 21 is a graphical representation of a simulation of actual power output, desired power output, and height (or vertical position) of the mass in the system. FIG. 21 illustrates a special case that can occur in some embodiments when the weights change direction, and the cable goes through a V=0 point. At this time, the amount of power being produced is zero. These adjustment periods can be long, and the system may not be complying with the desired power production during these periods. This is demonstrated by applying a desired signal of +100% and −100% of the desired output to the system, which is an extreme, hypothetical worst case scenario that does not necessarily represent actual real-world conditions. This illustrates that rapid response time may be beneficial. Typical frequency regulation requirements, although changing every 2 seconds, do not exhibit this kind of volatility.

Figure 22:
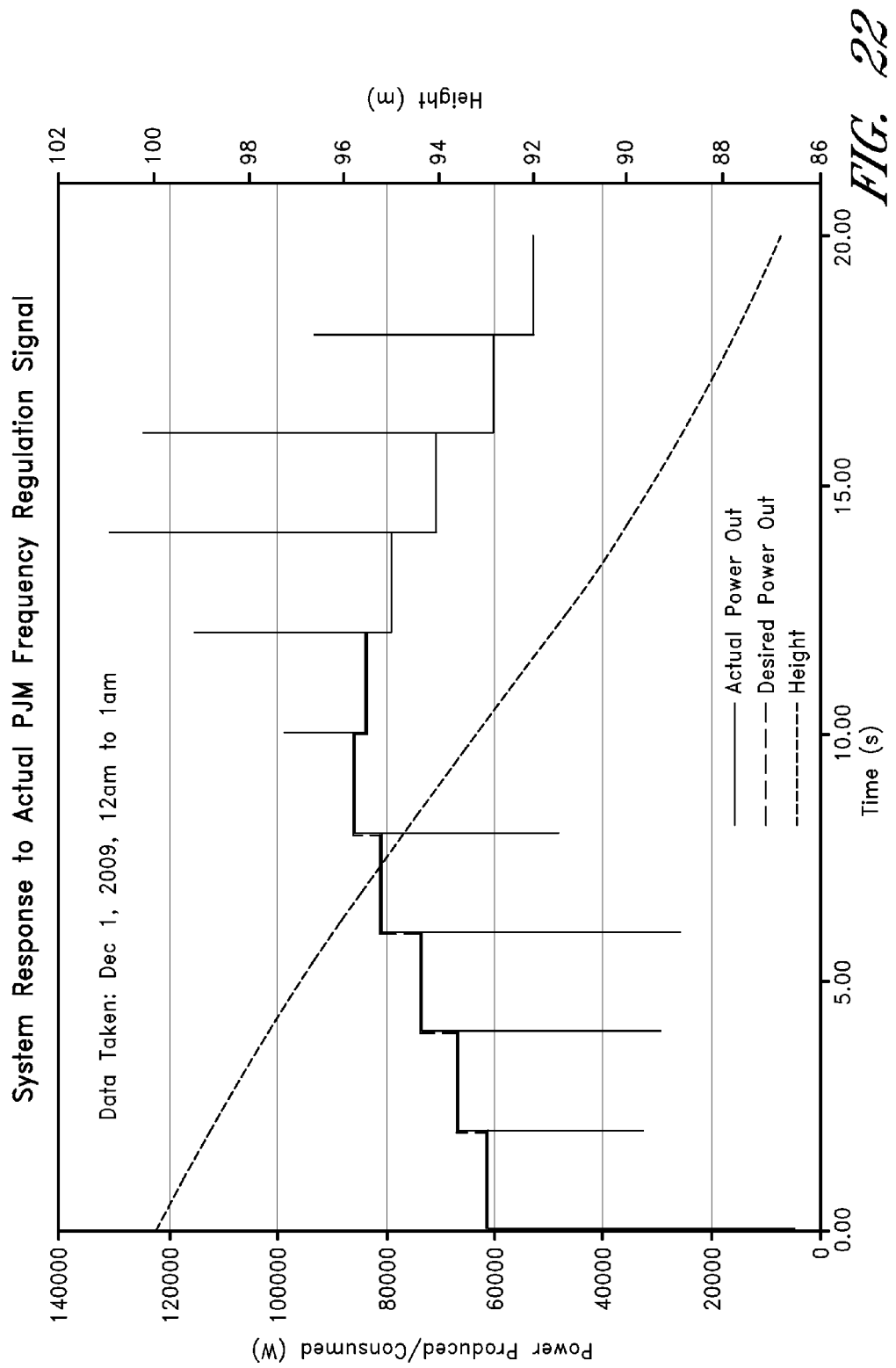
FIG. 22 is an example graphical representation of a response of a simulated energy storage device to actual power grid data, in particular, an actual PJM frequency regulation signal.

Actual data was input into a model of an embodiment of an energy storage device to observe the response. Data from Dec. 1, 2009 for the PJM fast response frequency regulation signal was used, for the hour between 12:00 am and 1:00 am. The response can be seen in FIG. 22. FIG. 22 shows that the time lag for a output adjustments, are less than 0.01 s. Secondly, the quick spikes or drops in power production do not exceed the maximum power production of the generators. The spikes are very quick, because the maximum acceleration was set to 9.8 meters/second$^2$. In any energy storage device embodiments disclosed herein, the control system can be configured to determine the maximum acceleration in real time depending on the optimum balance between spike height and response time. As mentioned, 9.81 meters/second$^2$ is the maximum acceleration possible, assuming a vertical rope, no energy loss, and a completely decoupled motor/power generator. While this is suitable for adjustments needed to increase the speed of the line, as the power can be dropped off the line for very short periods of time, allowing small accelerations to be made, it may be challenging to achieve this rapid control when the line speed needs to be reduced and more power is drawn from the line.

Figure 23:
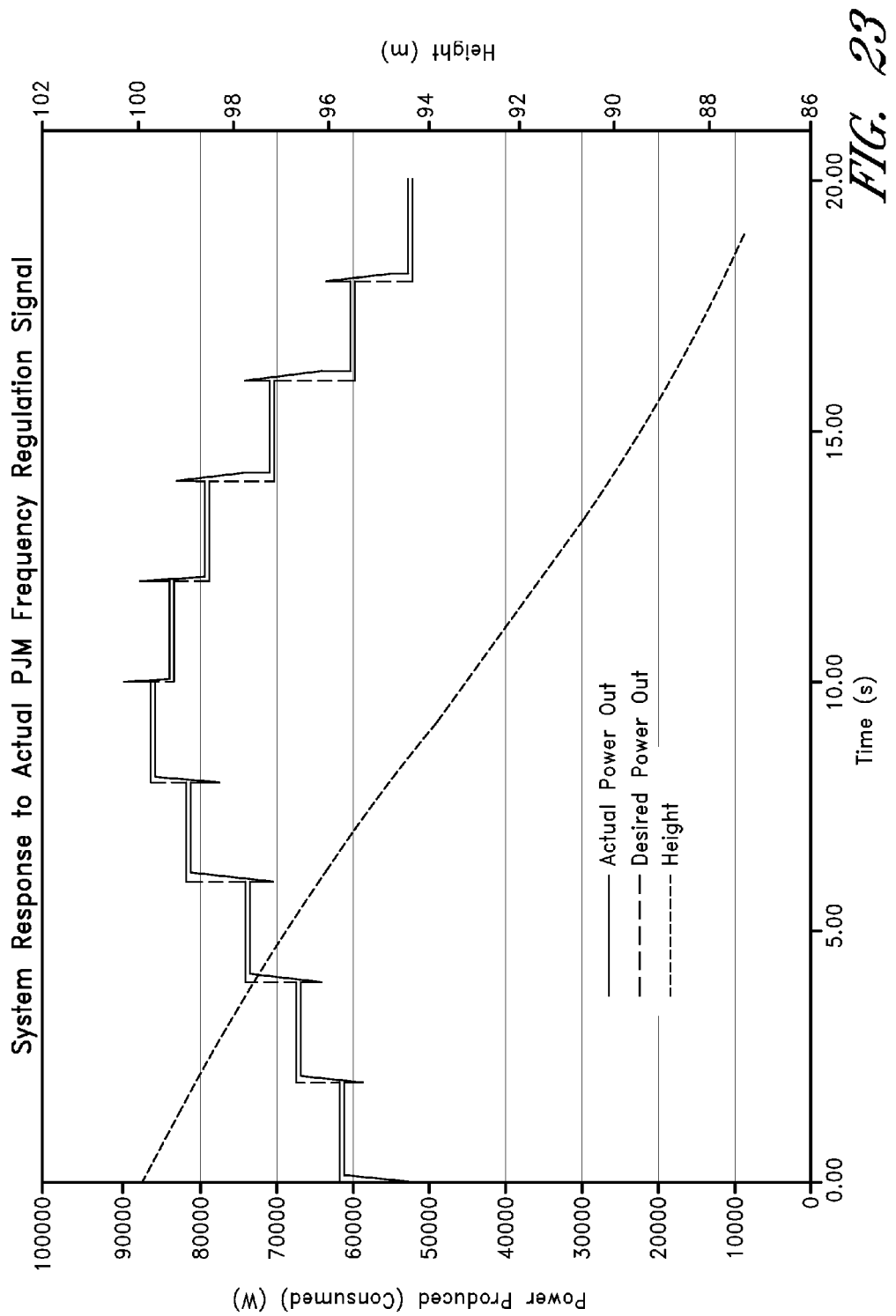
FIG. 23 is an example graphical representation of a response of a simulated energy storage device to actual power grid data, in particular, an actual PJM frequency regulation signal.
Figure 24:
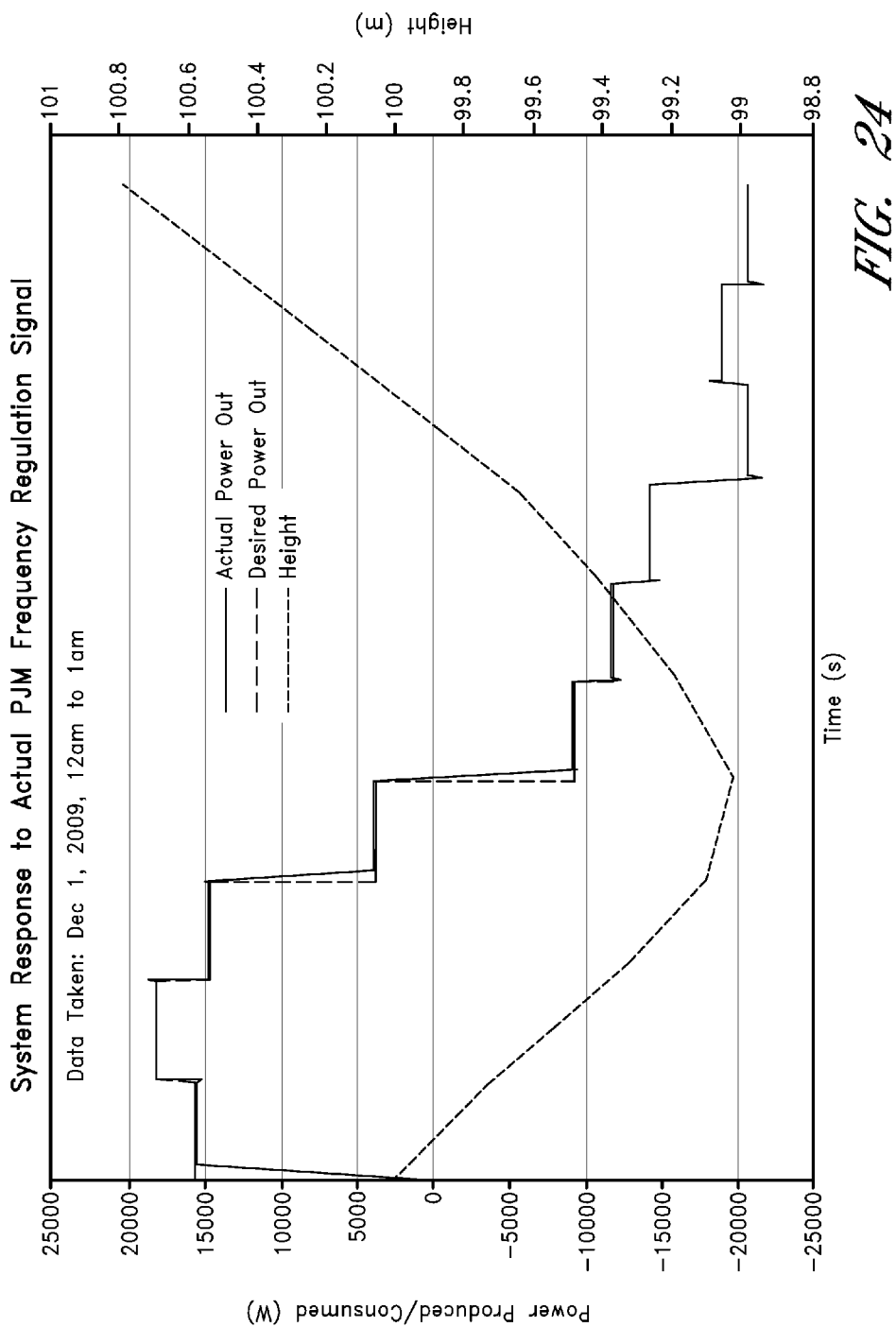
FIG. 24 is another example graphical representation of a response of a simulated energy storage device to actual power grid data, in particular, an actual PJM frequency regulation signal.

To examine the effects of reduced maximum acceleration, the maximum acceleration can be reduced to g/20, or 0.4905 meters/second$^2$, as illustrated in FIG. 23. With reduced acceleration, the response time can be lower, but, with reference to FIG. 23, is still 0.14 s. The spikes, however, can be seen to be dramatically less, which implies far easier control for the motor and accurate ability to meet the frequency regulation requirements. As a point of interest, a period of the data where a V=0 event is encountered is shown in the chart of FIG. 24. Notice that since the step changes are minor, even this can be handled with very little overshoot or delay periods. As long as the step changes are not too severe, the energy storage device embodiments disclosed should be able to respond adequately rapidly.

Figure 25:
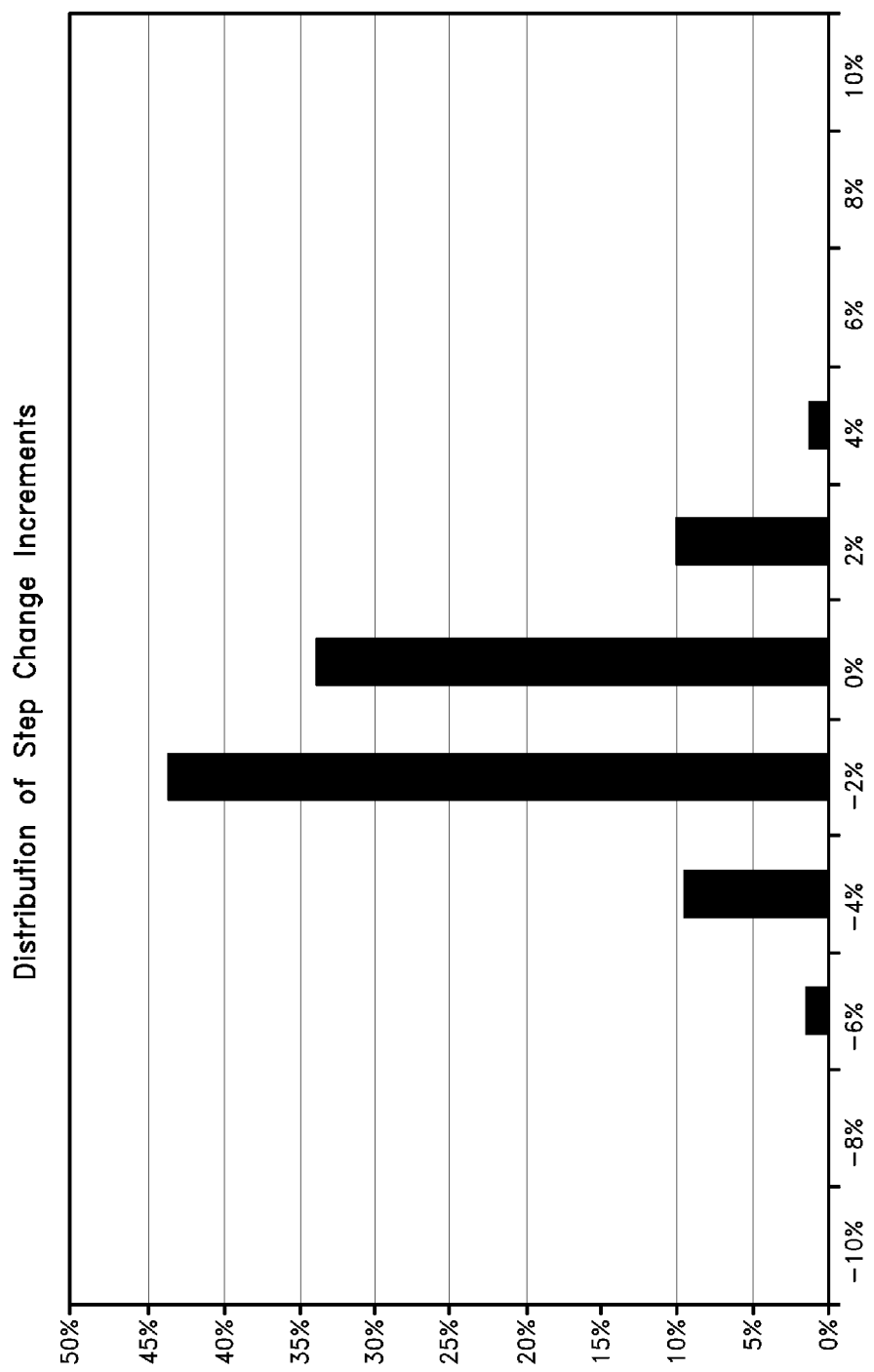
FIG. 25 is an example graphical illustration of a sample of power grid step change increments.

While it may be difficult for some embodiments of the energy storage devices disclosed herein to respond quickly to a 200% change or swing in energy demand (e.g., from −100% to +100%), at least some embodiments are configured to adequately respond well to smaller changes in demand. To determine what the typical adjustment swings will be, a histogram of changes for the data is shown in FIG. 25. It can be seen that typical operation is far less abrupt than the +/−100% analysis, and is typically only +/−2%, which can be easily controlled with at least some of the energy storage device embodiments disclosed herein.

There are a number of parameters which can be modified to meet the system needs, but these examples herein show just a few ways that the real-world requirements of the frequency regulation system can be met with very little response time, and small adjustments to the system.

Figure 26:
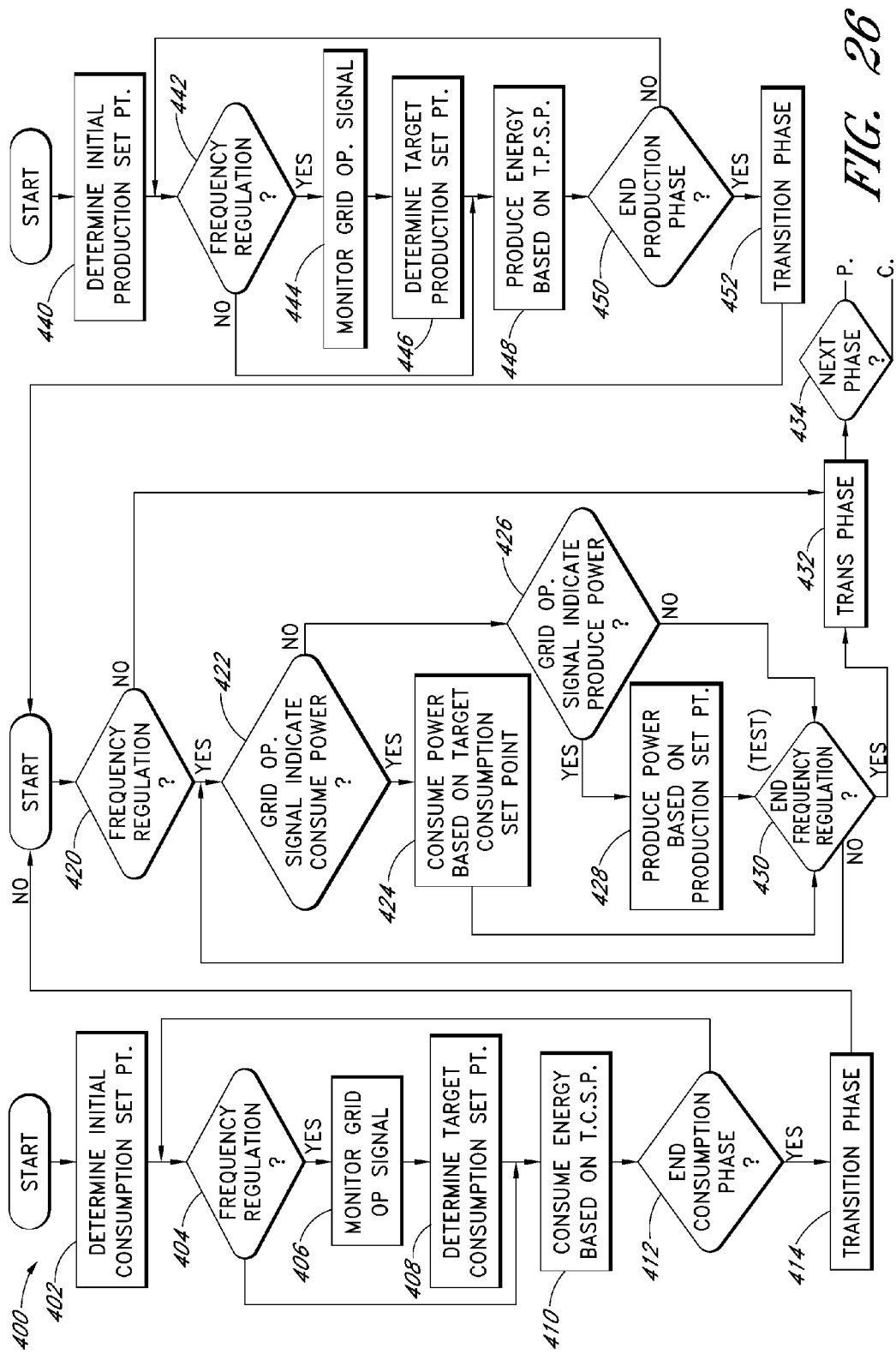
FIG. 26 is a flow chart of the method of energy management according to one example embodiment.

Illustrated in FIG. 26 is a flow chart of a method of energy management according to one example embodiment. At the beginning of a charge cycle, the energy storage system 100 is in an "uncharged" state in which a substantial portion (e.g., substantially all) of the mass or weight resides at a lower elevation level (e.g., at the bottom of an incline or cliff). At state 402, the process (e.g., executed by the controller of the storage system 100) determines an initial rate at which to consume power from the grid, this value being referred to herein as the initial consumption set point (ICSP). The ICSP and charge duration may be large enough to adequately charge the system before the start of the next phase described below. In general, the ICSP is based on a variety of factors including, but not limited to, some or all of the following factors: the energy storage capacity of the storage system, the maximum power capacity of the device, the price of energy (in the various long and short-term energy markets), and the prices of ancillary services (non-spinning reserve, spinning reserve, frequency regulation, and others).

If the storage system is operating in a charge-only mode, at state 410 the system begins drawing power from the grid in accordance with the ICSP. On the other hand, if the storage system 100 is configured to perform frequency regulation (FR) while charging, decision state 404 is answered in the affirmative and, at state 406 the storage system monitors the grid operator signal for instructions to implement frequency regulation in accordance with the terms of a contract (e.g., a pre-arranged contract) defining the time, duration, and power (e.g., the maximum power) to be regulated.

In practice, certain embodiments of the storage system 100 implement frequency regulation while charging by consuming power at the rate referred to herein as the target consumption set point (TCSP). In an example embodiment, the TCSP is set equal to (a) the sum of the fixed charge rate and the FR consumption rate when commanded from the grid to net increase power consumption (typically, when there is excess power on the grid), and (b) the initial charge rate less the FR production rate when commanded from the grid to net decrease power consumption (typically, when there is excess demand on the grid). The storage system 100 may continue to draw power from the grid until the consumption phase ends and decision state 412 is answered in the affirmative. Thereafter, the storage system may enter a transition phase 414 in which it sits idle until the start of the next phase.

After charging, the storage system 100 may proceed to a frequency regulation-only phase, power production phase, or combination of power production and FR. If, in the FR-only phase as shown in FIG. 1B, decision state 420 is answered in the affirmative and the system 100 monitors a signal from the grid operator indicating that the system should either consume power from or deliver power to the grid. If instructed to consume power, decision state 422 is answered in the affirmative, and at state 424 the storage system 100 consumes power corresponding to or in proportion to the TCSP. The absolute rate of power consumption may be dependent on the terms agreed to with the grid operator. If instructed to produce power, decision state 426 is answered in the affirmative, and at state 428 the storage system outputs power corresponding to or in proportion to the TPSP. The storage system 100 periodically checks and revises (e.g., every few seconds) the amount of power consumed and/or produced until the end of the frequency regulation phase at state 430 (although optionally the system may thereafter monitor power consumption and/or generation). Thereafter, the storage system 100 may wait in a transition phase 432 until the beginning of the next phase, at state 434, which may be a power consumption or power production phase.

In certain applications, the power production phase generally begins in the afternoon when electricity prices are relatively high and the storage system is fully or substantially "charged." At state 440, the system 100 determines an initial rate at which to produce power for the grid, this value being referred to herein as the initial production set point (IPSP). The rate and duration of power production may be large enough to adequately discharge the system before the start of the next charge phase.

If the storage system 100 is operating in a production-only mode, at state 448 the storage system 100 begins delivering power to the grid in accordance with the IPSP. On the other hand, if the storage system 100 is configured to perform frequency regulation while discharging power, decision state 442 is answered in the affirmative, and at state 444 the storage system 100 monitors the grid operator signal for instructions to implement frequency regulation (e.g., in accordance with the its agreement with the grid operator).

An example embodiment of the storage system 100 implements frequency regulation while producing by outputting power at the rate referred to herein as the target production set point (TPSP). In certain embodiments, the TPSP is substantially equal to (a) the sum of the fixed output rate and the FR power production rate when commanded from the grid to net increase power production (typically, this may occur when there is excess demand on the grid), and (b) the initial power output rate less the FR production rate when commanded from the grid to net decrease power production (typically, this may occur when there is excess power on the grid). The storage system 100 continues to deliver power to the grid until the production phase ends and decision state 450 is answered in the affirmative. Thereafter, at state 452, the storage system 100 may enter a transition phase in which it sits idle until the start of the next phase.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Implementations are included within the scope of the embodiments described herein which elements or functions which may be deleted, depending on the functionality involved, as would be understood by those skilled in the art.

While the above detailed description has shown, described, and pointed out novel features as applied to various embodiments, it will be understood that various omissions, substitutions, and changes in the form and details of the device or process illustrated can be made without departing from the spirit of the disclosure. Additionally, the various features and processes described above can be used independently of one another, or can be combined in various ways. All possible combinations and subcombinations are intended to fall within the scope of this disclosure.

As will be recognized, certain embodiments described herein can be embodied within a form that does not provide all of the features and benefits set forth herein, as some features can be used or practiced separately from others. The scope of the inventions is indicated by the appended claims rather than by the foregoing description. All changes which come within the meaning and range of equivalency of the claims are to be embraced within their scope.

What is claimed is:

1. An energy storage and generation system, comprising:
   a cable system comprising a cable, the cable system having a first end portion located at a first elevation and a second end portion located at a second elevation;
   a plurality of mass carriers supported by the cable so that two or more of the mass carriers are in motion when the cable is being driven;
   one or more motor generators coupled with the cable system and with an electrical grid, the one or more motor generators configured to drive the cable system to store energy and configured to be driven by the cable system to generate electricity for the electrical grid;
   a control system in communication with at least the one or more motor generators;
   a first mass pile area at the first elevation;
   a second mass pile area at the second elevation; and
   a processor configured for receiving a signal from a grid operator, and, based at least in part on said signal, determining whether to store energy or generate electricity for the electrical grid;
   wherein:
   the second elevation is higher than the first elevation;
   the system is configured to store energy by transferring mass medium from the first mass pile area to the second mass pile area;
   the system is configured to generate electricity by transferring mass medium from the second mass pile area to the first mass pile area;
   the energy storage and generation system is configured to:
      transfer mass medium from the first mass pile area to at least one of the plurality of mass carriers supported by the cable while at the same time transferring mass medium from at least one of the plurality of mass carriers supported by the same cable to the second mass pile area at the second elevation; and
      transfer mass medium from the second mass pile area to at least one of the plurality of mass carriers supported by the cable while at the same time transferring mass medium from at least one of the plurality of mass carriers supported by the same cable to the first mass pile area at the first elevation.

2. The energy storage system of claim 1, comprising one or more discharge devices positioned beneath a portion of each of the first mass pile area and the second first mass pile area.

3. The energy storage system of claim 2, wherein each discharge device comprises a valve configured to move between an open position and a closed position such that, when in an open position, mass medium can be discharged from the respective mass pile area and, when in a closed position, mass medium is substantially prevented from being discharged from the respective mass pile area.

4. The energy storage system of claim 3, wherein the system is configured to load mass medium into the carriers by causing the carriers to traverse underneath at least one discharge device.

5. The energy storage system of claim 1, comprising one or more power electronics modules configured to condition the electricity produced by the one or more motor generators for the electrical grid.

6. The energy storage system of claim 1, wherein the plurality of mass carriers are carriers positioned substantially uniformly along substantially the entire length of the cable system.

7. The energy storage system of claim 1, further comprising a tipping mechanism configured to selectively tip a given carrier so as to cause the given carrier to discharge mass medium carried thereby.

8. The energy storage system of claim 1, wherein the system is configured to provide at least one of bulk energy storage, bulk energy generation, frequency regulation, a combination of bulk energy storage and frequency regulation, and a combination of bulk energy generation and frequency regulation.

9. The energy storage system of claim 1, wherein the system is configured to enhance energy frequency regulation, and at least:
bulk energy storage, or
bulk energy generation, or
both bulk energy storage and bulk energy generation.

10. An energy storage and generation system, comprising:
a cable system comprising a cable, the cable system having a first portion located at a first elevation and a second end portion located at a second elevation;
a plurality of mass carriers supported by the cable so that two or more of the mass carriers are in motion when the cable is being driven;
one or more motor generators coupled with the cable system and with an electrical grid, the one or more motor generators configured to drive the cable system to store energy and configured to be driven by the cable to generate electricity for the electrical grid;
a control system in communication with at least the one or more motor generators;
a first mass pile area at the first elevation;
a second mass pile area at the second elevation; and
a processor configured for receiving a signal from a grid operator, and, based at least in part on said signal, determining whether to store energy or generate electricity for the electrical grid; and
one or more discharge devices positioned beneath a portion of each of the first mass pile area and the second first mass pile area;
wherein:
the second elevation is higher than the first elevation;
the system is configured to store energy by transferring mass medium from the first mass pile area to the second mass pile area;
the system is configured to generate electricity by transferring mass medium from the second mass pile area to the first mass pile area;
each discharge device comprises a valve configured to move between an open position and a closed position such that, when in an open position, mass medium can be discharged from the respective mass pile area and, when in a closed position, mass medium is substantially prevented from being discharged from the respective mass pile area; and the energy storage and generation system is configured to:
transfer mass medium from the first mass pile area to at least one of the plurality of mass carriers supported by the cable while at the same time transferring mass medium from at least one of the plurality of mass carriers supported by the same cable to the second mass pile area at the second elevation; and
transfer mass medium from the second mass pile area to at least one of the plurality of mass carriers supported by the cable while at the same time transferring mass medium from at least one of the plurality of mass carriers supported by the same cable to the first mass pile area at the first elevation.

11. The energy storage system of claim 10, wherein the first mass pile comprises at least one of dirt, sand, rock, mine tailings, gravel, or other similar native or naturally occurring material.

12. The energy storage system of claim 10, wherein the system is configured to provide at least one of bulk energy storage, bulk energy generation, frequency regulation, a combination of bulk energy storage and frequency regulation, and a combination of bulk energy generation and frequency regulation.

13. An energy storage and generation system, comprising:
a cable system comprising a cable, the cable system having a first end portion located at a first elevation and a second portion located at a second elevation;
a plurality of mass carriers supported by the cable so that two or more of the mass carriers are in motion when the cable is being driven;
one or more motor generators coupled with the cable system and with an electrical grid, the one or more motor generators configured to drive the cable system to store energy and configured to be driven by the cable to generate electricity for the electrical grid;
a control system in communication with at least the one or more motor generators;
a first mass pile area at the first elevation;
a second mass pile area at the second elevation; and
a processor configured for receiving a signal from a grid operator, and, based at least in part on said signal, determining whether to store energy or generate electricity for the electrical grid;
wherein:
the second elevation is higher than the first elevation;
the system is configured to store energy by transferring mass medium from the first mass pile area to the second mass pile area;
the system is configured to generate electricity by transferring mass medium from the second mass pile area to the first mass pile area; and
the plurality of mass carriers are positioned substantially uniformly along substantially the entire length of the cable system; and
the cable system forms a continuous loop between the first portion and the second portion such that the cable system can move one or more mass carriers from the first elevation toward the second elevation while simultaneously moving one or more mass carriers from the second elevation toward the first elevation.

14. The energy storage system of claim 13, wherein at least a portion of the carriers are configured to discharge the mass medium carried thereby onto at least one of the first mass pile area and the second mass pile area.

15. The energy storage system of claim 13, wherein the first mass pile comprises at least one of dirt, sand, rock, mine tailings, gravel, or other similar native or naturally occurring material.

16. The energy storage system of claim 13, wherein the system is configured to provide at least one of bulk energy storage, bulk energy generation, frequency regulation, a combination of bulk energy storage and frequency regulation, and a combination of bulk energy generation and frequency regulation.

17. An energy storage and generation system, comprising:
- a cable system comprising a cable, the cable system having a first portion located at a first elevation and a second portion located at a second elevation;
- a plurality of mass carriers supported by the cable so that two or more of the mass carriers are in motion when the cable is being driven;
- one or more motor generators coupled with the cable system and with an electrical grid, the one or more motor generators configured to drive the cable system to store energy and configured to be driven by the cable to generate electricity for the electrical grid;
- a control system in communication with at least the one or more motor generators;
- a first mass pile area at the first elevation;
- a second mass pile area at the second elevation;
- a processor configured for receiving a signal from a grid operator, and, based at least in part on said signal, determining whether to store energy or generate electricity for the electrical grid; and
- a tipping mechanism configured to selectively tip a given carrier so as to cause the given carrier to discharge mass medium carried thereby;

wherein:
- the second elevation is higher than the first elevation;
- the system is configured to store energy by transferring the mass medium from the first mass pile area to the second mass pile area; and
- the system is configured to generate electricity by transferring mass medium from the second mass pile area to the first mass pile area; and
- the cable forms a continuous loop between the first portion and the second portion such that the cable can move one or more mass carriers from the first elevation toward the second elevation while at the same time moving one or more mass carriers from the second elevation toward the first elevation.

18. The energy storage system of claim 17, wherein at least a portion of the carriers are configured to discharge the mass medium carried thereby onto at least one of the first mass pile area and the second mass pile area.

19. The energy storage system of claim 17, wherein the first mass pile comprises at least one of dirt, sand, rock, mine tailings, gravel, or other similar native or naturally occurring material.

20. The energy storage system of claim 17, wherein the system is configured to provide at least one of bulk energy storage, bulk energy generation, frequency regulation, a combination of bulk energy storage and frequency regulation, and a combination of bulk energy generation and frequency regulation.

21. The energy storage system of claim 1, wherein the first mass pile comprises at least one of dirt, sand, rock, mine tailings, gravel, or other similar native or naturally occurring material.

* * * * *

UNITED STATES PATENT AND TRADEMARK OFFICE
CERTIFICATE OF CORRECTION

| | |
|---|---|
| PATENT NO. | : 8,674,527 B2 |
| APPLICATION NO. | : 13/111717 |
| DATED | : March 18, 2014 |
| INVENTOR(S) | : Fyke et al. |

Page 1 of 1

It is certified that error appears in the above-identified patent and that said Letters Patent is hereby corrected as shown below:

In the Specification

In column 4 at line 35, Change "device;" to --device.--.

In column 6 at line 63, Change "the there" to --there--.

In the Claims

In column 33 at line 32, In Claim 10, change "second end" to --second--.

In column 34 at line 27, In Claim 13, change "first end" to --first--.

In column 34 at line 53 (approx.), In Claim 13, change "area; and" to --area;--.

In column 36 at line 5, In Claim 17, change "area; and" to --area;--.

Signed and Sealed this
Second Day of September, 2014

Michelle K. Lee
*Deputy Director of the United States Patent and Trademark Office*